US012669323B2

(12) United States Patent
Lee et al.

(10) Patent No.: US 12,669,323 B2
(45) Date of Patent: Jun. 30, 2026

(54) COATING THICKNESS MEASURING DEVICE AND COATING DEVICE INCLUDING THE SAME

(71) Applicant: LG Chem, Ltd., Seoul (KR)

(72) Inventors: Do-Hyun Lee, Daejeon (KR); Seung-Heon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 54 days.

(21) Appl. No.: 18/695,689

(22) PCT Filed: Apr. 25, 2023

(86) PCT No.: PCT/KR2023/005631
§ 371 (c)(1),
(2) Date: Mar. 26, 2024

(87) PCT Pub. No.: WO2023/211125
PCT Pub. Date: Nov. 2, 2023

(65) Prior Publication Data
US 2025/0231020 A1     Jul. 17, 2025

(30) Foreign Application Priority Data

Apr. 29, 2022     (KR) ........................ 10-2022-0053733
Apr. 17, 2023     (KR) ........................ 10-2023-0050350

(51) Int. Cl.
*G01B 11/06*          (2006.01)
*G01B 11/30*          (2006.01)
(52) U.S. Cl.
CPC ...... *G01B 11/0625* (2013.01); *G01B 11/0683* (2013.01); *G01B 11/0691* (2013.01); *G01B 11/306* (2013.01)
(58) Field of Classification Search
CPC ............ G01B 11/0625; G01B 11/0683; G01B 11/0691; G01B 11/306
See application file for complete search history.

(56) References Cited

U.S. PATENT DOCUMENTS 6,706,315 B2 * 3/2004 Trabold ................ B05C 5/0254
                                                              427/256
2006/0086245 A1 * 4/2006 Pitkanen .............. D21G 9/0045
                                                              92/1
(Continued)

FOREIGN PATENT DOCUMENTS

CN          107321557 A       11/2017
CN          112924457 A        6/2021
(Continued)

OTHER PUBLICATIONS

International Search Report for Application No. PCT/KR2023/005631 mailed Aug. 17, 2023, 3 pages.
(Continued)

*Primary Examiner* — Tarifur R Chowdhury
*Assistant Examiner* — Joshua M Carlson
(74) *Attorney, Agent, or Firm* — Lerner David LLP

(57)          ABSTRACT

A coating thickness measuring device is configured to measure a thickness of a coating material applied to a substrate which is fed by a coating roll on which the substrate is rolled. The coating thickness measuring device includes a coating thickness measurement module, wherein the coating thickness measurement module includes a light applying unit configured to apply light to a surface of the coating material applied to a portion of the substrate rolled on the coating roll, a light acquisition unit configured to acquire light reflected from the surface of the coating material, and a processor configured to calculate the thickness of the coating material based on the acquired light. Accordingly, when measuring the thickness of the coating material the thickness measurement accuracy may be improved. A coating device including the same is also provided.

13 Claims, 21 Drawing Sheets

(56)                References Cited

U.S. PATENT DOCUMENTS

| | | | |
|---|---|---|---|
| 2012/0288616 A1 * | 11/2012 | Zierhut | G01B 21/085 73/150 R |
| 2013/0201493 A1 | 8/2013 | Ichizawa | |
| 2021/0025687 A1 | 1/2021 | Ichikawa | |
| 2021/0074564 A1 | 3/2021 | Sugita et al. | |
| 2021/0382173 A1 | 12/2021 | Hughes et al. | |
| 2023/0173527 A1 | 6/2023 | Lee et al. | |
| 2025/0231020 A1 | 7/2025 | Lee et al. | |
| 2025/0244123 A1 * | 7/2025 | Tsuchiya | G01B 5/0002 |

FOREIGN PATENT DOCUMENTS

| | | | | | |
|---|---|---|---|---|---|
| CN | 114273163 | A | 4/2022 | | |
| JP | S649587 | A | 1/1989 | | |
| JP | H01291107 | A | 11/1989 | | |
| JP | H0715373 | B2 | 2/1995 | | |
| JP | H0831158 | B2 | 3/1996 | | |
| JP | H08278117 | A | 10/1996 | | |
| JP | H11248425 | A | 9/1999 | | |
| JP | 2965065 | B2 | 10/1999 | | |
| JP | H11276959 | A | 10/1999 | | |
| JP | 2000346635 | A | 12/2000 | | |
| JP | 2004012293 | A | 1/2004 | | |
| JP | 2006234760 | A | 9/2006 | | |
| JP | 2009047665 | A | 3/2009 | | |
| JP | 2012194140 | A | 10/2012 | | |
| JP | 2012216375 | A | 11/2012 | | |
| JP | 2013160581 | A | 8/2013 | | |
| JP | 5413655 | B2 | 2/2014 | | |
| JP | 2019158823 | A | 9/2019 | | |
| JP | 2021044288 | A | 3/2021 | | |
| JP | 6932527 | B2 | 9/2021 | | |
| JP | 2021126608 | A | 9/2021 | | |
| JP | 2021193373 | A | 12/2021 | | |
| KR | 101185003 | B1 * | 10/2012 | | G01B 11/0625 |
| KR | 101200075 | B1 | 11/2012 | | |
| KR | 101243573 | B1 | 3/2013 | | |
| KR | 20130090342 | A | 8/2013 | | |
| KR | 101383209 | B1 * | 4/2014 | | G01N 21/59 |
| KR | 101442810 | B1 * | 9/2014 | | B05B 7/12 |
| KR | 20150054185 | A | 5/2015 | | |
| KR | 101528000 | B1 | 6/2015 | | |
| KR | 101810025 | B1 | 12/2017 | | |
| KR | 102043459 | B1 | 11/2019 | | |
| KR | 102336266 | B1 | 12/2021 | | |
| KR | 20220008762 | A | 1/2022 | | |
| WO | 2010120214 | A1 | 10/2010 | | |

OTHER PUBLICATIONS

Extended European Search Report including Written Opinion for Application No. 23796768.2 dated Aug. 13, 2024. 7 pgs.

International Search Report for Application No. PCT/KR2023/005631 mailed Aug. 17, 2023. 4 pages.

International Search Report for Application No. PCT/KR2023/005629 mailed Aug. 2, 2023, pp. 1-3.

* cited by examiner

COATING THICKNESS MEASURING DEVICE AND COATING DEVICE INCLUDING THE SAME

CROSS-REFERENCE TO RELATED APPLICATIONS

The present application is a national phase entry under 35 U.S.C. § 371 of International Application No. PCT/KR2023/005631 filed Apr. 25, 2023, which claims priority to Korean Patent Application No. 10-2022-0053733 filed on Apr. 29, 2022 and Korean Patent Application No. 10-2023-0050350 filed on Apr. 17, 2023, with the Korean Intellectual Property Office, the disclosures of which are incorporated herein by reference in their entirety.

TECHNICAL FIELD

The present disclosure relates to a coating thickness measuring device and a coating device including the same, and more particularly, to a coating thickness measuring device for accurately measuring the thickness of a coating material applied on a substrate and a coating device including the same.

BACKGROUND ART

With the technological development of, and increasing demand for, mobile devices, the demand for secondary batteries as a source of energy is also rapidly growing.

Secondary batteries essentially include an electrode assembly which is a power generation element. The electrode assembly may be formed into a predetermined shape by applying an electrode active material to a positive electrode current collector and a negative electrode current collector to manufacture a positive electrode and a negative electrode, respectively. The positive electrode and the negative electrode are then stacked on two sides of a separator. After the electrode assembly is received in a battery case, an electrolyte is injected and the battery case is sealed to form a secondary battery.

Meanwhile, the separator that constitutes part of the electrode assembly may be formed by applying a coating material containing a mixture of a polymer binder, a dispersant, heat resistant fillers or the like to one or two surfaces of the substrate.

The conventional separator coating device includes a slot die to dispense the coating material and a coating roll. The conventional separator coating device applies the coating material to one or two surfaces of the substrate while rotating the coating roll and dries the substrate coated with the coating material.

The conventional separator coating device is configured to measure the coating thickness of the coating material applied on the substrate using a replacement sensor on and/or under the surface of the substrate passing between a coating roll and another coating roll (for example, a guide roll).

However, due to noise caused by vibration in the conventional separator coating device and temperature of the coating material, the conventional separator coating device has low accuracy with respect to coating thickness measurement of the coating material applied on the substrate.

Additionally, the conventional separator coating device implements substrate permeation using an isotope source by measuring the thickness of the substrate before coating, applying the coating material to the substrate, drying the substrate coated with the coating material and measuring the dry density of the substrate. In this case, since the thickness of the substrate coated with the coating material is estimated using the measured dry density of the substrate, it is difficult to accurately measure the actual coating thickness.

Moreover, in the case of the conventional separator coating device, the replacement sensor scans in the widthwise direction (Transverse Direction (TD)) of the substrate perpendicular to the lengthwise direction (coating direction) of the substrate, and the average value of data obtained by the scans of the replacement sensor is used, requiring a large amount of measurement data, and making it difficult to accurately measure the actual coating thickness.

TECHNICAL PROBLEM

The present disclosure is designed to solve the above-described problem, and therefore the present disclosure is directed to providing a coating thickness measuring device for accurately measuring the thickness of a coating material applied on a substrate and a coating device including the same.

However, the technical problem to be solved by the present disclosure is not limited to the above-described problem, and these and other problems will be clearly understood by those skilled in the art from the following description.

TECHNICAL SOLUTION

A coating thickness measuring device according to an aspect of the present disclosure is configured to measure a thickness of a coating material applied to a substrate which is fed by a coating roll on which the substrate is rolled, and includes a coating thickness measurement module, and the coating thickness measurement module may include a light applying unit configured to apply light to a surface of the coating material applied to a portion of the substrate rolled on the coating roll; a light acquisition unit configured to acquire light reflected from the surface of the coating material; and a processor configured to calculate the thickness of the coating material based on the acquired light.

Preferably, the coating thickness measurement module may be configured to move in 3-axis directions of the coating roll to apply the light to the portion of the substrate rolled on the coating roll.

Preferably, the coating thickness measurement module may be configured to measure the thickness of the coating material applied to a portion of the substrate contacting an outer surface of the coating roll.

Preferably, the coating thickness measurement module may be configured to measure the thickness of the coating material applied to an end portion at which the contact between the substrate and the coating roll is maintained in the portion of the substrate rolled on the coating roll.

Preferably, the coating thickness measurement module may be configured to measure the thickness of the coating material while it is located on a center line of the coating roll passing through the end portion at which the contact between the substrate and the coating roll is maintained.

Preferably, a plurality of the coating thickness measurement modules may be arranged in a lengthwise direction of the coating roll, and a distance between the plurality of coating thickness measurement modules may be adjustable.

Preferably, the coating thickness measuring device may further include a position movement module configured to move the coating thickness measurement module with respect to the coating roll.

Preferably, the position movement module may be coupled to a coating material coating device which applies the coating material to the substrate, and the coating thickness measurement module may be disposed in the position movement module and configured to move to the portion of the substrate rolled on the coating roll.

Preferably, the position movement module may further include a first position movement unit configured to move the coating thickness measurement module in a lengthwise direction of the coating roll; and a guide unit configured to guide the movement of the first position movement unit in the lengthwise direction of the coating roll.

Preferably, the guide unit may be coupled to a coating material coating device which applies the coating material to the substrate.

Preferably, the position movement module may further include a second position movement unit coupled to one side of the first position movement unit and configured to move the coating thickness measurement module in at least one direction of a horizontal direction or a vertical direction of the coating roll perpendicular to a lengthwise direction of the coating roll, and the coating thickness measurement module may measure the thickness of the coating material applied to the substrate at a location to which the coating thickness measurement module is moved by the second position movement unit.

Preferably, the position movement module may further include a rotation actuation unit to rotate the coating thickness measurement module in a clockwise or counterclockwise direction.

Preferably, the coating thickness measuring device may further include a temperature measurement module configured to measure a temperature change of the coating roll at a location of the coating roll on which the substrate is rolled.

Preferably, the coating thickness measuring device may further include a coating roll rotation detection module coupled to an end of the coating material coating device adjacent to the coating roll and configured to detect one revolution the coating roll; and a vibration measurement module configured to measure roundness of the coating roll.

Preferably, the processor may be configured to correct the thickness of the coating material applied to the substrate using the measurement data acquired from the coating thickness measuring device.

Additionally, a coating device according to another aspect of the present disclosure includes the above-described coating thickness measuring device; and a coating material coating device configured to apply the coating material to the substrate which is fed by the coating roll on which the substrate is rolled.

ADVANTAGEOUS EFFECTS

According to an aspect of the present disclosure, it may be possible to improve the thickness measurement accuracy of the coating material applied on the substrate by minimizing the influence of shake of the substrate when measuring the thickness of the coating material.

Many other additional effects may be achieved by many other embodiments of the present disclosure. These effects of the present disclosure will be described in detail in each embodiment, or description of effects that can be easily understood by those skilled in the art is omitted.

DESCRIPTION OF DRAWINGS

FIG. 3 is a side view of the coating thickness measuring device shown in FIG. 1.

FIGS. 5 and 6 are diagrams showing a coating thickness measurement module shown in FIG. 1 moving with respect to a coating roll.

FIG. 12 is a diagram showing a coating thickness measurement module shown in FIG. 11 measuring the thickness of a coating material applied to a substrate.

FIG. 15 is a side view of the coating thickness measuring device shown in FIG. 13.

FIG. 16 is a partial top view of the coating thickness measuring device shown in FIG. 13.

FIGS. 17 and 18 are diagrams showing a coating thickness measurement module shown in FIG. 13 moving with respect to a coating roll.

DETAILED DESCRIPTION

Hereinafter, exemplary embodiments of the present disclosure will be described in detail with reference to the accompanying drawings. Prior to the description, it should be understood that the terms or words used in the specification and the appended claims should not be construed as limited to general and dictionary meanings, but rather interpreted based on the meanings and concepts corresponding to the technical aspect of the present disclosure on the basis of the principle that the inventor is allowed to define terms appropriately for the best explanation.

Therefore, the embodiments described herein and illustrations in the accompanying drawings are an exemplary embodiment of the present disclosure to describe the technical aspect of the present disclosure and are not intended to be limiting, and thus it should be understood that a variety of other equivalents and modifications could have been made thereto at the time that the application was filed.

In the following description, a substrate B may refer to a separator or an electrode plate (a positive electrode plate or a negative electrode plate) of a secondary battery. Additionally, for example, when the substrate B is the separator, a coating material S may refer to ceramic particles for forming a ceramic particle layer on the surface of the separator, and when the substrate B is the electrode plate (the positive electrode plate or the negative electrode plate), the coating material S may refer to a positive electrode active material slurry or a negative electrode active material slurry.

Meanwhile, the substrate is not necessarily limited to the separator or the electrode plate, or the coating material is not necessarily limited to the ceramic particles or the electrode active material slurry. That is, it is noted that a coating device according to the present disclosure may be used in the field of secondary battery technology as well as a wide range of coating technology using a roll to roll process.

Figure 1:
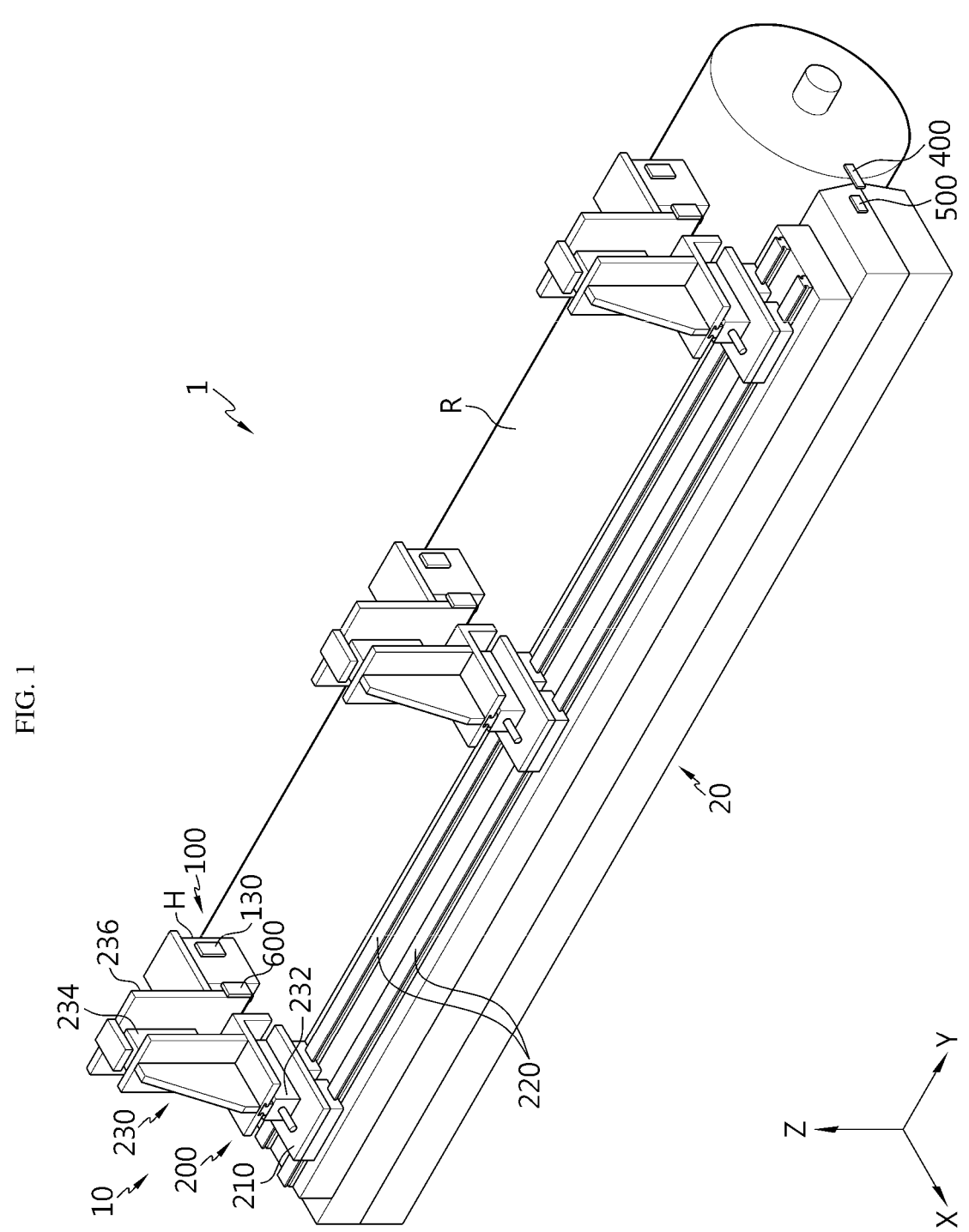
FIG. 1 is a diagram showing the entire shape of a coating device according to an embodiment of the present disclosure.
Figure 2:
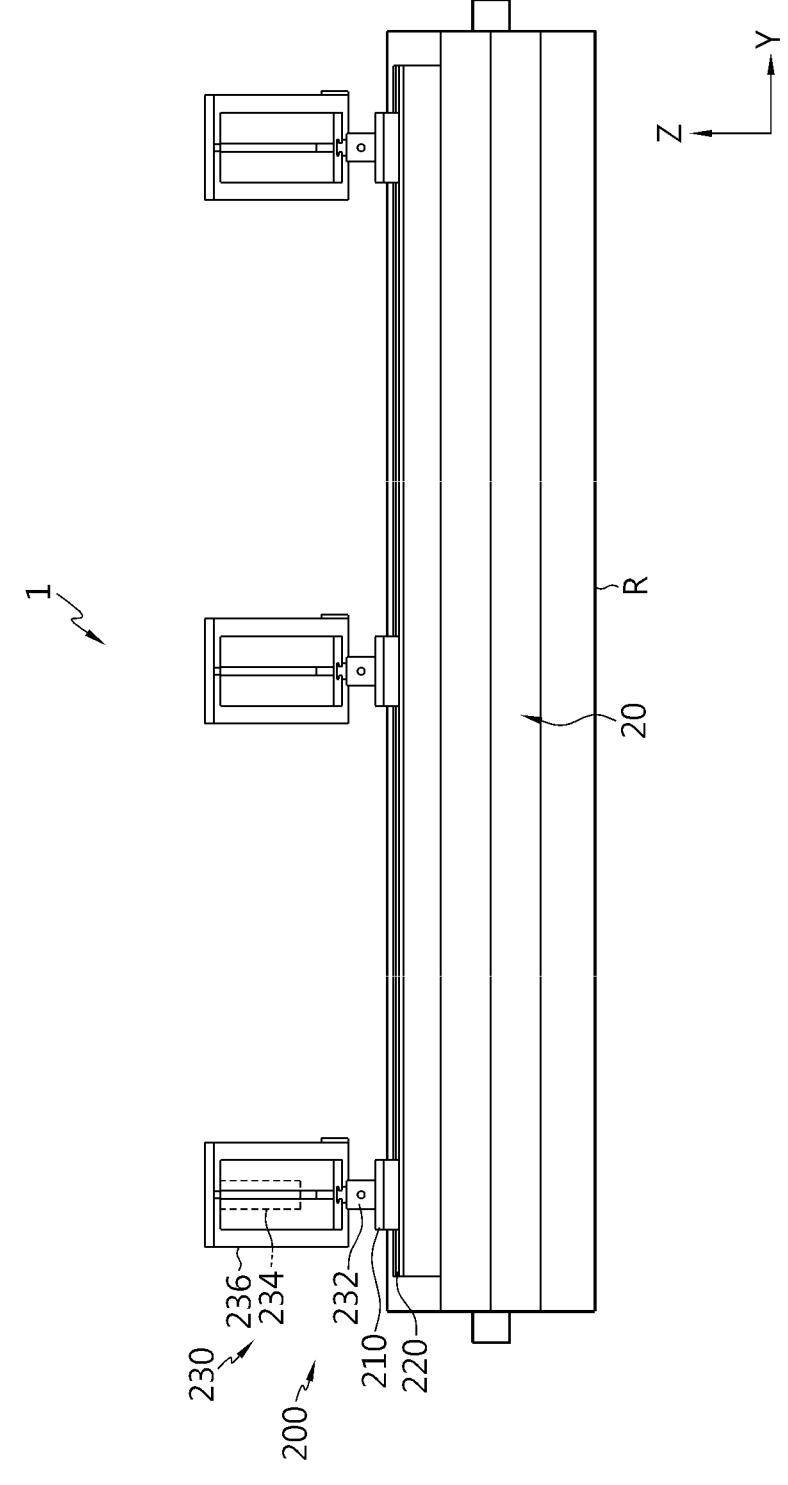
FIG. 2 is a front view of a coating thickness measuring device of the coating device of FIG. 1.
Figure 3:
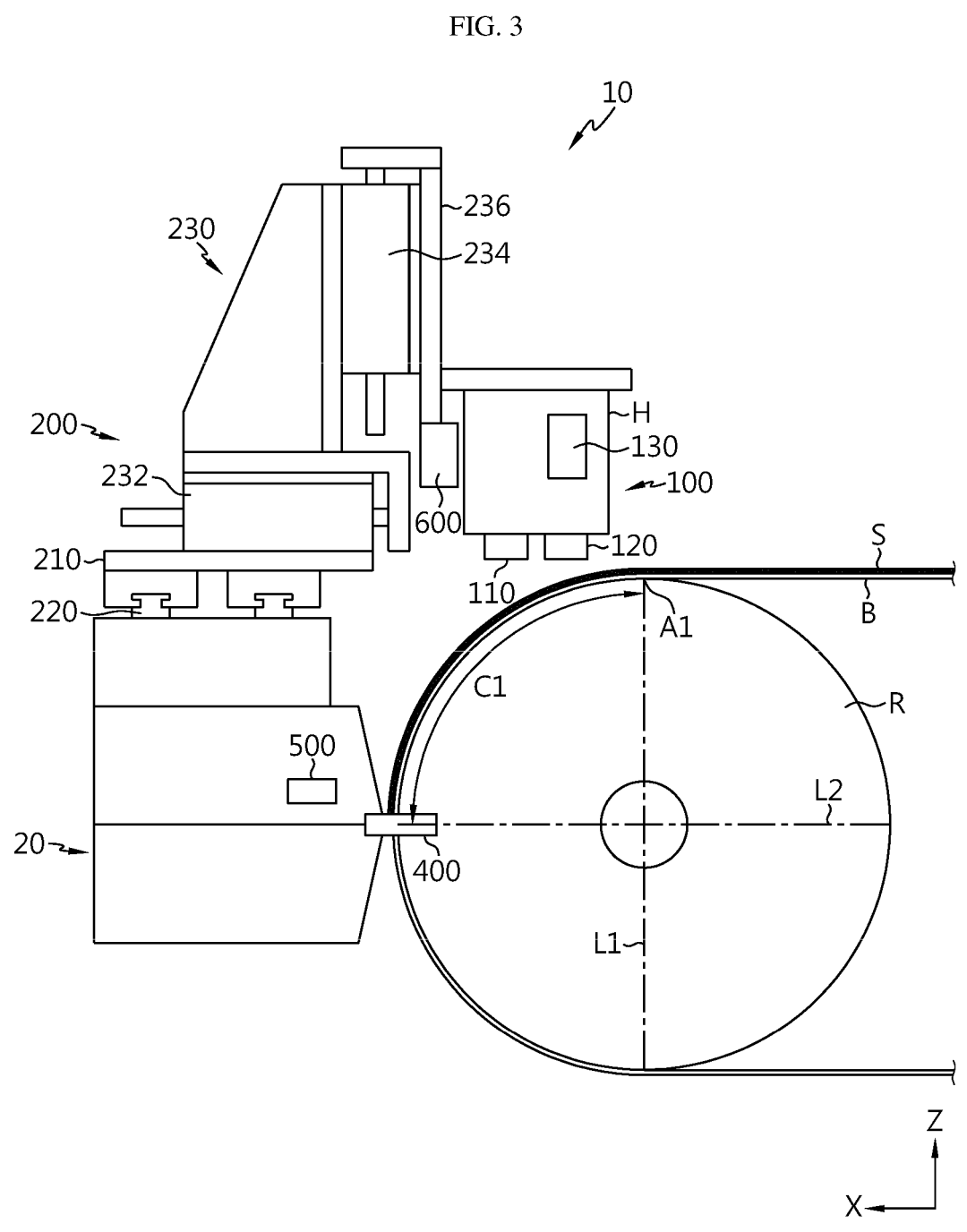
Figure 4:
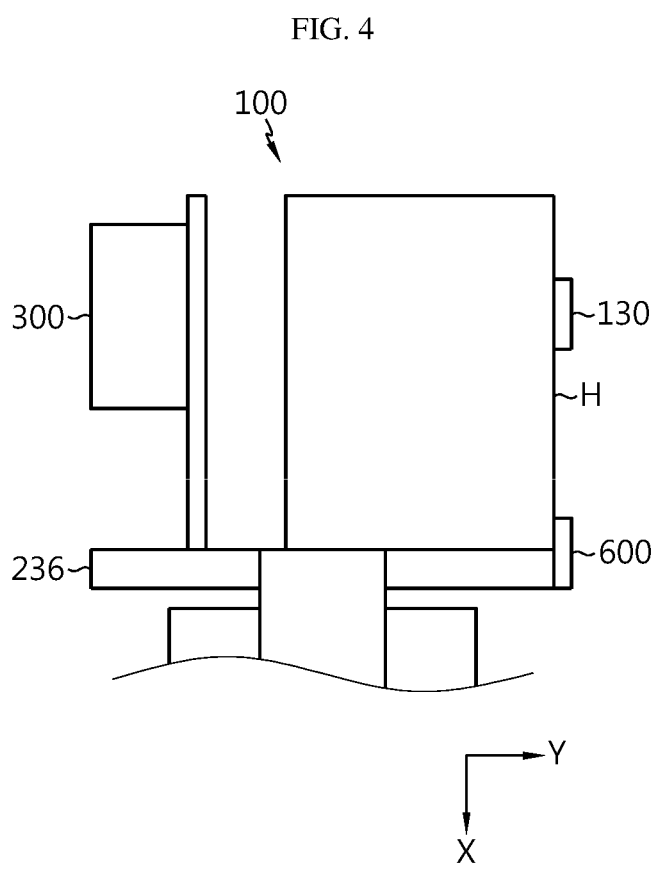
FIG. 4 is a partial top view of the coating thickness measuring device shown in FIG. 1.

FIG. 1 is a diagram showing the entire shape of the coating device 1 according to an embodiment of the present disclosure, FIG. 2 is a front view of a coating thickness measuring device 10 of the coating device 1 of FIG. 1, FIG. 3 is a side view of the coating thickness measuring device 10 shown in FIG. 1, and FIG. 4 is a partial top view of the coating thickness measuring device 10 shown in FIG. 1. In this instance, in FIGS. 1 and 2, illustration of the coating material S and the substrate B as described below is omitted.

In an embodiment of the present disclosure, the X axis direction shown in the drawing may refer to a horizontal direction, the Y axis direction may refer to a lengthwise direction perpendicular to the X axis direction on a horizontal plane (XY plane), and the Z axis direction may refer to a vertical direction perpendicular to the X axis direction and the Y axis direction.

Referring to FIGS. 1 to 4, the coating device 1 according to an embodiment of the present disclosure may include the coating thickness measuring device 10 and a coating material coating device 20.

The coating thickness measuring device 10 may include a coating thickness measurement module 100.

The coating thickness measurement module 100 may be configured to measure the thickness of the coating material S applied to the substrate B which is fed by a rotating coating roll R on which the substrate B is rolled. Additionally, the coating roll R may be formed in a cylindrical shape. Here, the coating material S may be dispensed from the coating material coating device 20 and continuously applied to the surface of the substrate which is moved by the coating roll R on which the substrate is rolled.

The coating thickness measurement module 100 may include a light applying unit 110, a light acquisition unit 120 and a processor 130. In an example, the coating thickness measurement module 100 may be a noncontact laser replacement sensor, but is not limited thereto. Specifically, the coating thickness measurement module 100 may include a housing H, and the light applying unit 110, the light acquisition unit 120 and the processor 130 may be disposed in the housing H.

The light applying unit 110 may be configured to apply light (for example, a laser) to the surface of the coating material S applied to the substrate B. In an example, the light applying unit 110 may include a light source (not shown) inside the housing H and/or a transparent lens configured to allow light from the light source to pass through.

More specifically, the light applying unit 110 may be configured to apply light to the surface of the coating material S applied to a portion of the substrate B rolled on the coating roll R.

For example, in FIG. 3, the portion of the substrate B rolled on the coating roll R may be a portion of the substrate B located on the left side of the coating roll R on the basis of a vertical center line L1 of the coating roll R.

The light acquisition unit 120 may be configured to acquire light reflected from the surface of the coating material S applied to the portion of the substrate B rolled on the coating roll R. In an example, the light acquisition unit 120 may include a light receiving lens and/or a light receiving device configured to collect reflected light. In this case, the light reflected from the surface of the coating material S and acquired through the light receiving lens may be focused on the light receiving device (not shown, for example, CMOS) inside the housing H.

The processor 130 may be configured to calculate the thickness of the coating material S based on the light acquired by the light acquisition unit 120.

By way of example, the processor 130 may acquire a wavelength domain spectrum for an amplitude ratio or a phase difference of light focused on the light receiving device and measure the thickness of the coating material S using fast Fourier transform.

In addition to the coating roll on which the substrate is rolled while the substrate is fed, the conventional coating thickness measuring device further includes a guide roll (not shown) to guide the movement of the substrate in the coating direction. The conventional coating thickness measuring device has low accuracy of thickness measurement of the coating material due to shake of the substrate surface due to a noise signal such as vibration of the machine when measuring the thickness of the coating material applied to the portion of the substrate moving in air between the coating roll and the guide roll.

Additionally, since the conventional coating thickness measuring device acquires the thickness measurement data of the coating material while moving the replacement sensor in the widthwise direction of the substrate perpendicular to the coating direction, it is difficult to accurately measure the thickness of the coating material due to vibration caused by the movement of the replacement sensor.

In contrast, the coating thickness measurement module 100 of the present disclosure is configured to measure the thickness of the coating material S applied to the portion of the substrate B rolled on the coating roll R with minimized shake of a target point for thickness measurement, thereby improving the thickness measurement accuracy of the coating material S.

Meanwhile, the coating material coating device 20 may apply the coating material S to the substrate B. For example, the coating material coating device 20 may be a slot die that dispenses the coating material S through an outlet formed in the shape of a slit. The coating material coating device 20 may apply the coating material S to the substrate B to form a coating layer (for example, a wet film).

Additionally, the coating material coating device 20 may be connected to an external coating material supply chamber (not shown) to receive the coating material.

In the embodiment shown in FIGS. 1 to 3, the coating material coating device 20 may be disposed adjacent to the side of the coating roll R to dispense the coating material S towards the coating roll R. For example, the coating material coating device 20 may be disposed on a horizontal center line L2 of the coating roll R, but is not limited thereto.

Figure 5:
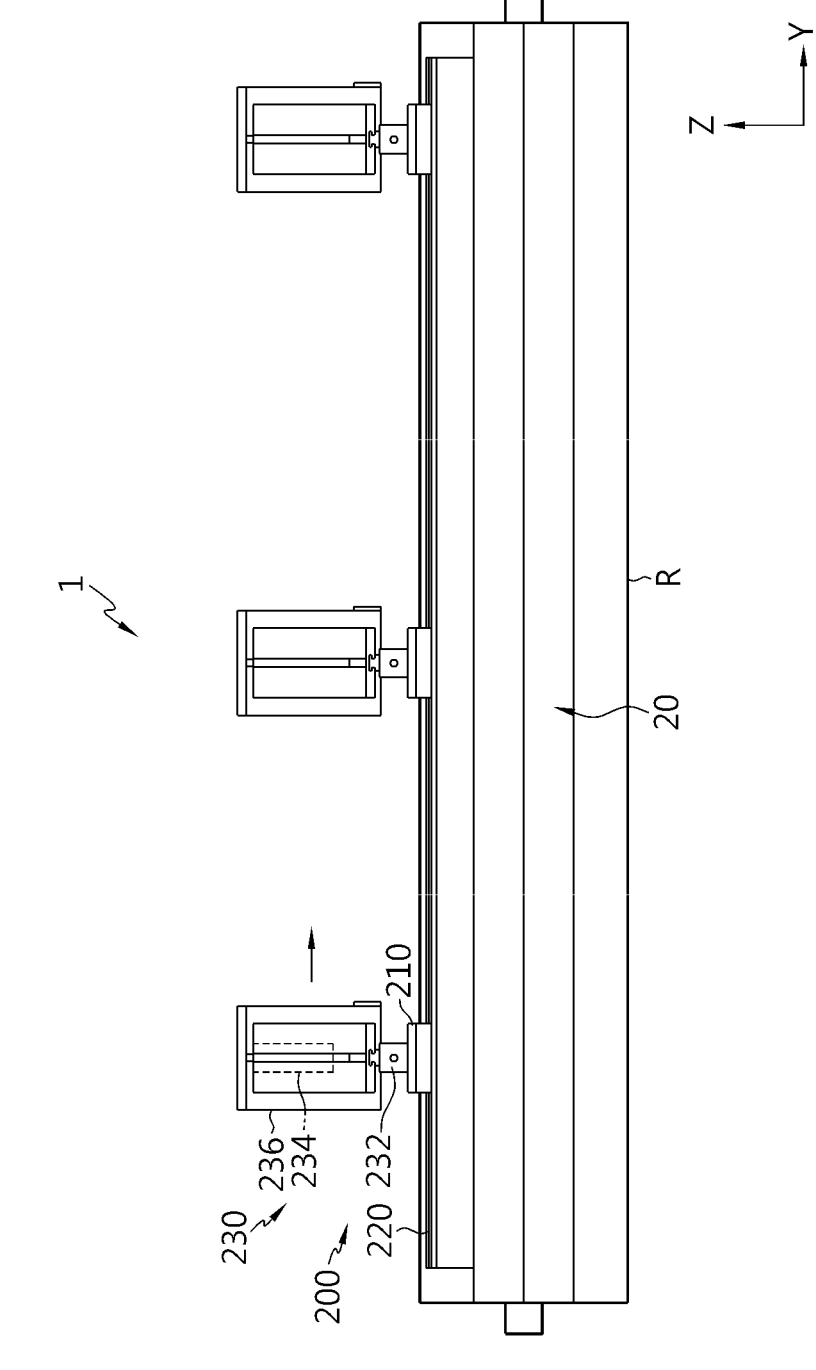
Figure 6:
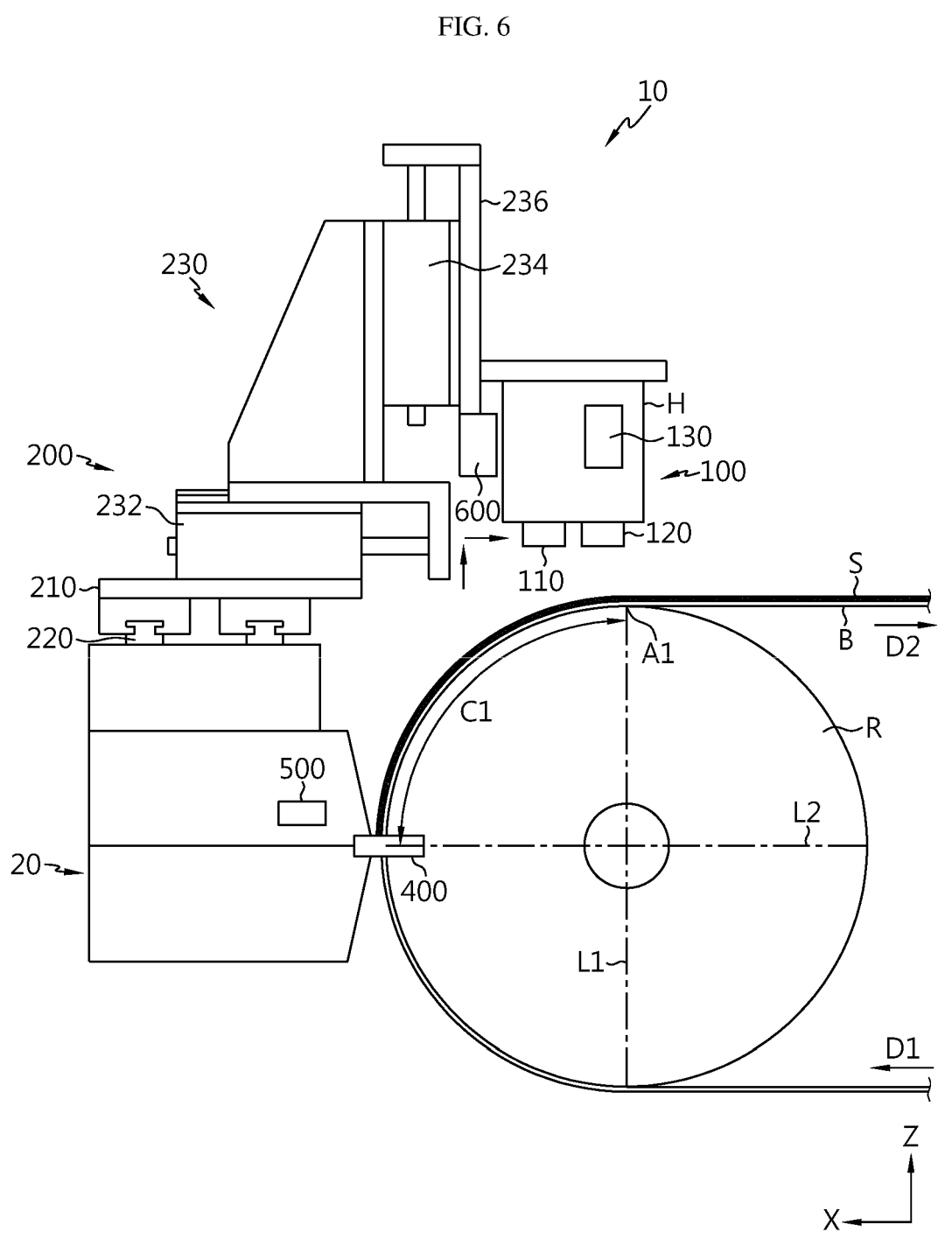

FIGS. 5 and 6 are diagrams showing the coating thickness measuring device 10 shown in FIG. 1 moving with respect to the coating roll R. Specifically, FIG. 5 is a diagram showing the coating thickness measurement module 100 moving in the lengthwise direction of the coating roll R, and FIG. 6 is a diagram showing the coating thickness measurement module 100 moving in the horizontal direction (±X) and the vertical direction (±Z) of the coating roll R.

Referring to FIG. 1 and FIGS. 5 and 6, the coating thickness measurement module 100 may be configured to move in 3-axis directions with respect to the coating roll R to apply light to the portion of the substrate B rolled on the coating roll R. Specifically, the coating thickness measurement module 100 may be configured to move in at least one direction of the lengthwise direction (±Y), the horizontal direction (±X) or the vertical direction (±Z) of the coating roll R.

The coating thickness measurement module 100 may measure the coating thickness of the substrate B rolled on the coating roll R with less shake rather than the portion of the substrate B moving in air, thereby improving the thickness measurement accuracy of the coating material S.

Figure 7:
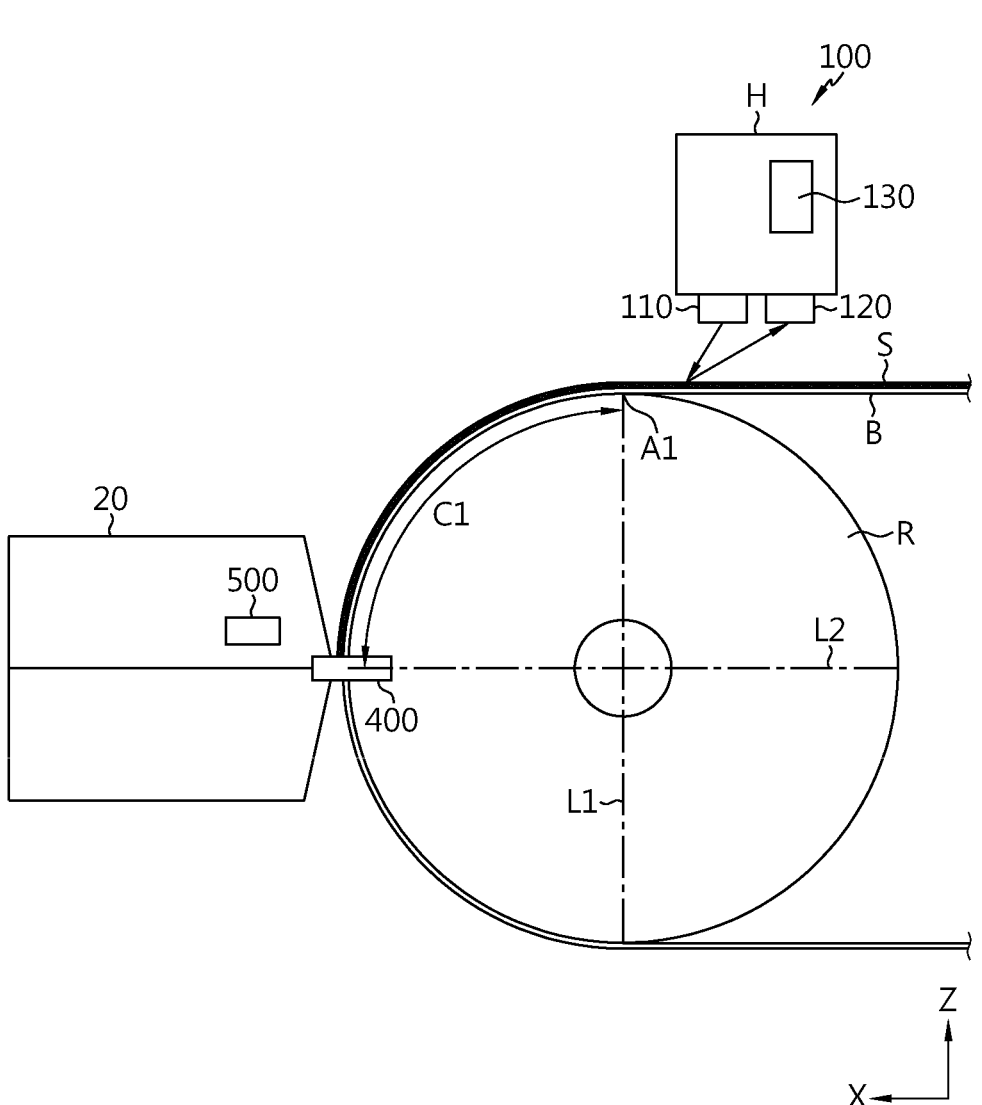
FIGS. 7 to 9 are diagrams showing a coating thickness measurement module shown in FIG. 1 measuring the thickness of a coating material applied to a substrate.
Figure 8:
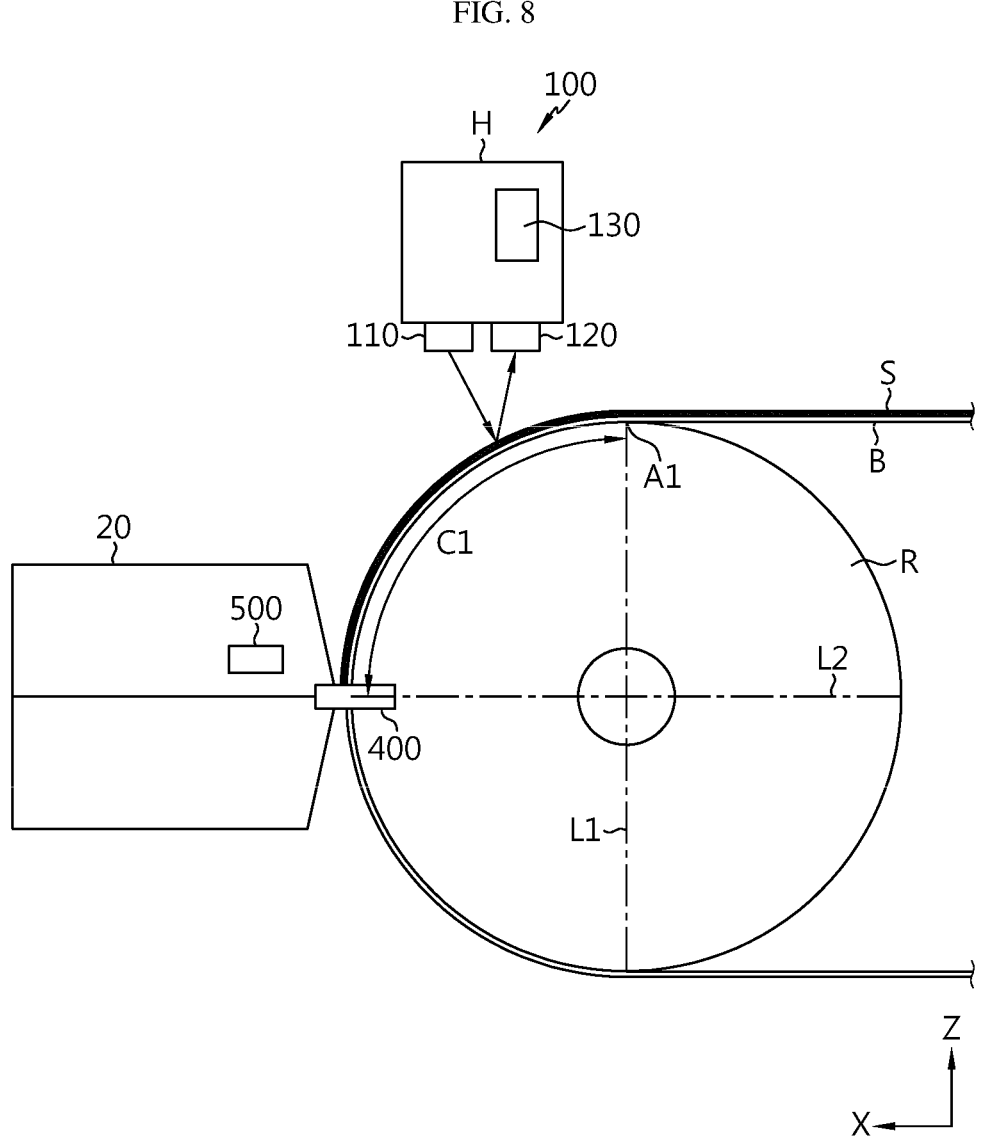
Figure 9:
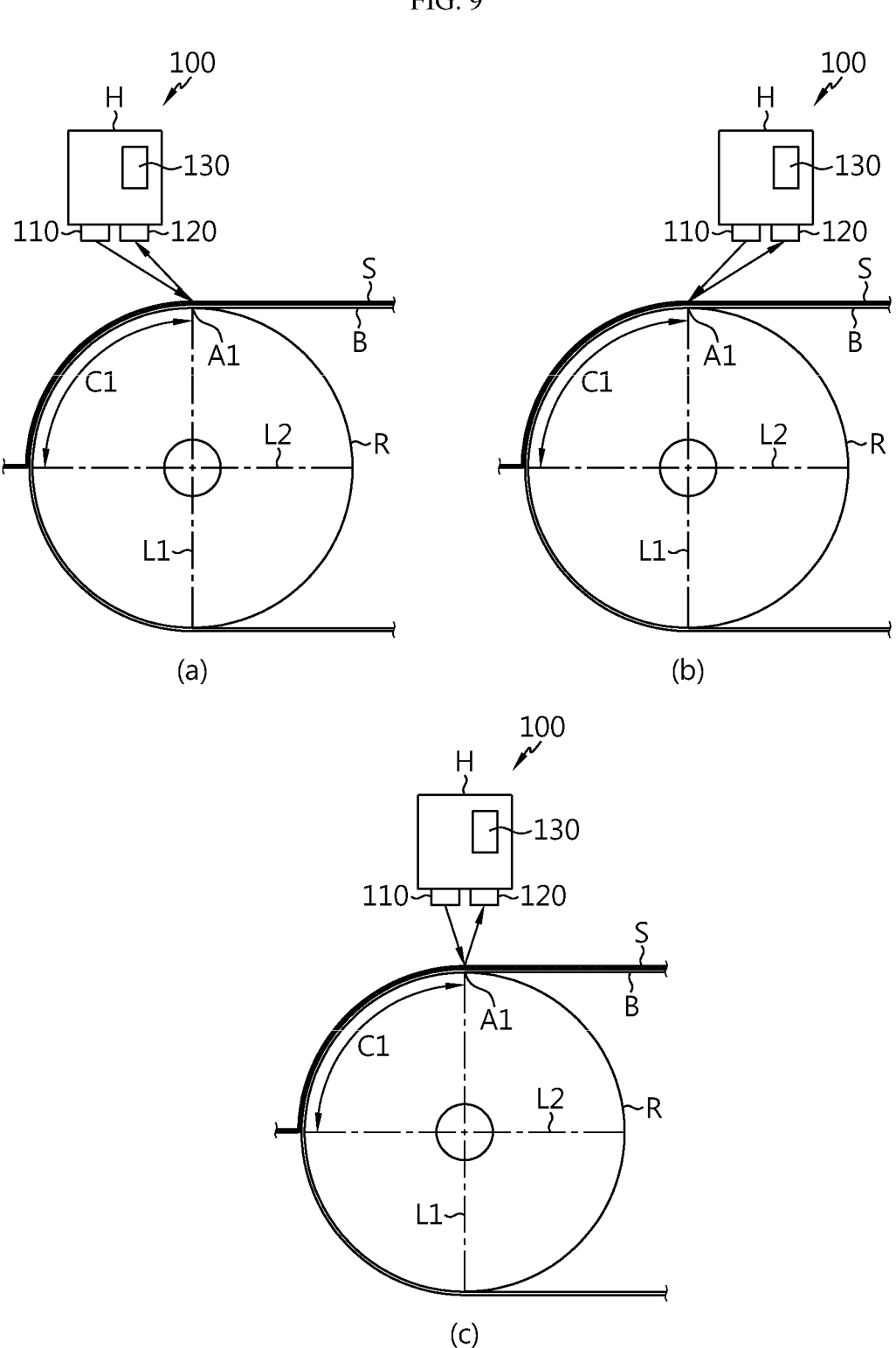

FIGS. 7 to 9 are diagrams showing the coating thickness measuring device 10 shown in FIG. 1 measuring the thickness of the coating material S applied to the substrate B. Specifically, FIG. 7 is a diagram showing the coating thickness measurement module 100 located at the right side on the basis of the vertical center line L1 of the coating roll R. FIG. 8 is a diagram showing the coating thickness measurement module 100 located at the left side on the basis of the vertical center line L1 of the coating roll R. FIG. 9 is a diagram showing the coating thickness measurement module 100 measuring the thickness of the coating material S applied to the portion of the substrate B located on the center line of the coating roll R.

Specifically, referring to FIGS. 7 to 9, the coating thickness measurement module 100 may be configured to measure the thickness of the coating material S applied to the portion of the substrate B rolled on the coating roll R as described above.

By way of example, the coating thickness measurement module 100 may measure the thickness of the coating material S applied to the substrate B when it is located at the right side on the basis of the vertical center line L1 of the coating roll R as shown in FIG. 7.

Alternatively, the coating thickness measurement module 100 may measure the thickness of the coating material S applied to the substrate B when it is located at the left side on the basis of the vertical center line L1 of the coating roll R as shown in FIG. 8. In this instance, the substrate B located at the left side on the basis of the vertical center line L1 of the coating roll R may be rolled in close contact with the outer surface of the coating roll R. More specifically, the substrate B located at the left side on the basis of the vertical center line L1 of the coating roll R may come into close contact with the outer surface of the coating roll R between the upper end and the lower end of the coating roll R on the basis of the horizontal center line L2 of the coating roll R.

In this case, as shown in FIG. 8, the coating thickness measurement module 100 may be configured to measure the thickness of the coating material S applied to the portion of the substrate B contacting the outer surface of the coating roll R. In this instance, the coating thickness measurement module 100 may be configured to measure the thickness of the coating material S applied to the substrate B in close contact with the outer surface of the coating roll R from a point at which the coating material coating device 20 starts applying the coating material S to the upper end of the coating roll R.

In FIG. 8, an area of the substrate B coated with the coating material S of which the thickness is to be measured by the coating thickness measurement module 100 may be indicated by C1 in FIG. 8. That is, the area of the substrate B indicated by C1 in FIG. 8 may be the portion of the substrate B in close contact with the outer surface of the coating roll R from the point at which the coating material coating device 20 starts applying the coating material S to the upper end of the coating roll R.

Additionally, the coating thickness measurement module 100 may move in at least one direction of the horizontal direction or the vertical direction of the coating roll R and then fix the position to measure the thickness of the coating material S applied to the portion of the substrate B in direct contact with the outer surface of the coating roll R among the entire area of the substrate B.

Accordingly, the coating thickness measurement module 100 may measure the thickness of the coating material S more accurately at the thickness measurement location with further minimized shake of the substrate B.

Meanwhile, in the case where the coating roll R is cylindrical, even though the substrate B contacts the outer surface of the coating roll R, when light is applied from the light applying unit 110 to the surface of the coating material S corresponding to a location having a high degree of bend of the substrate B rolled on the coating roll R, the resolution of light acquired through the light acquisition unit 120 may be low.

Preferably, the coating thickness measurement module 100 may be configured to measure the thickness of the coating material S of the end portion A1 at which the contact between the substrate B and the coating roll R is maintained in the portion of the substrate B rolled on the coating roll R.

More specifically, as shown in (a) of FIG. 9, when it is located at the left side on the basis of the vertical center line L1 of the coating roll R, the coating thickness measurement module 100 may measure the thickness of the coating material S applied to the surface of the substrate B located on the vertical center line L1 of the coating roll R in the end portion A1 at which the contact between the substrate B and the coating roll R is maintained.

In this instance, when it is located at the left side on the basis of the vertical center line L1 of the coating roll R, the light applying unit 110 may apply light to the surface of the coating material S applied to the portion A1 of the substrate B located on the vertical center line L1 of the coating roll R, and the light acquisition unit 120 may acquire light reflected from the surface of the coating material S applied to the portion A1 of the substrate B located on the vertical center line L1 of the coating roll R.

Alternatively, as shown in (b) of FIG. 9, when it is located at the right side on the basis of the vertical center line L1 of the coating roll R, the coating thickness measurement module 100 may measure the thickness of the coating material S applied to the surface of the substrate B located on the vertical center line L1 of the coating roll R in the end portion A1 at which the contact between the substrate B and the coating roll R is maintained.

In this instance, when it is located at the right side on the basis of the vertical center line L1 of the coating roll R, the light applying unit 110 may apply light to the surface of the coating material S applied to the portion A1 of the substrate B located on the vertical center line L1 of the coating roll R. Additionally, the light acquisition unit 120 may acquire light reflected from the surface of the coating material S applied to the portion A1 of the substrate B located on the vertical center line L1 of the coating roll R.

Accordingly, the coating thickness measurement module 100 may measure the thickness of the coating material S more accurately by measuring the thickness of the coating material S applied to the portion of the substrate B located on the center line of the coating roll R at which the degree of bend of the substrate B rolled on the coating roll R is minimum.

As described above, the coating thickness measurement module 100 may be configured to apply light to the surface of the coating material S through the light applying unit 110, and acquire light reflected from the surface of the coating material S through the light acquisition unit 120. Accordingly, as the incident angle of light applied to the surface of the coating material S and the reflection angle of light reflected from the surface of the coating material S is lower, the coating thickness measurement module 100 may increase the resolution of light acquired through the light acquisition unit 120, thereby improving the thickness measurement accuracy of the coating material S.

Referring to (c) of FIG. 9, when it is located on the center line (for example, the vertical center line L1) of the coating roll R passing through the end portion at which the contact between the substrate and the coating roll is maintained, the coating thickness measurement module 100 may be configured to measure the thickness of the coating material S applied to the portion of the substrate B located on the center line of the coating roll R (for example, the portion A1 of the substrate B located on the vertical center line L1 of the coating roll R).

In this case, the coating thickness measurement module 100 may not only measure the thickness of the coating material S coated on the portion of the substrate B located on the center line of the coating roll R at which the degree of bend of the substrate B rolled on the coating roll R is minimum, but also minimize the incident angle of light applied to the surface of the coating material S and the reflection angle of light reflected from the surface of the coating material S, thereby measuring the thickness of the coating material S more accurately.

As described above, the coating thickness measurement module 100 may move in at least one direction of the horizontal direction or the vertical direction of the coating roll R and fix the position to measure the thickness of the coating material S applied to the portion of the substrate B contacting the outer surface of the coating roll R. In this instance, when a plurality of the coating thickness measurement modules 100 is arranged, it may be possible to accurately measure the thickness of the coating material S in the widthwise direction of the substrate B which is the lengthwise direction of the coating roll R.

In an embodiment, the plurality of coating thickness measurement modules 100 may be arranged in the lengthwise direction of the coating roll R.

In this instance, the distance between the plurality of coating thickness measurement modules 100 may be adjusted. More specifically, the distance between the plurality of coating thickness measurement modules 100 may be adjusted in the lengthwise direction (Y axis direction) of the coating roll R. In an example, the distance between the plurality of coating thickness measurement modules 100 may be adjusted according to the widthwise length of the substrate B.

By the exemplary configuration of the present disclosure, it may be also possible to rapidly measure the thickness of the coating material S in the widthwise direction of the substrate B (the lengthwise direction of the coating roll R). Additionally, it may be possible to measure whether coating is uniform in the widthwise direction of the substrate B, thereby further improving the thickness measurement accuracy of the coating material S.

The coating thickness measuring device 10 may further include a position movement module 200.

The position movement module 200 may be configured to move the coating thickness measurement module 100 with respect to the coating roll R. In this instance, the position movement module 200 may be disposed on the bottom surface of the work area. Although not shown, the position movement module 200 may be disposed in a frame connected to the rotation axis of the coating roll R, or a support configuration disposed on the bottom surface of the work area.

More specifically, the position movement module 200 is a structure including a plurality of actuators, and may be configured to move the coating thickness measurement module 100 in at least one direction of the lengthwise direction, the horizontal direction or the vertical direction of the coating roll R.

Accordingly, the coating thickness measurement module 100 may measure the thickness of the coating material S at the portion of the substrate B rolled on the coating roll R more easily. Additionally, by the position movement module 200, the coating thickness measurement module 100 may move to the location of the substrate B having high thickness measurement accuracy of the coating material S and various locations of the coating material S applied to the substrate B.

In particular, the position movement module 200 may be coupled to the coating material coating device 20 which applies the coating material S to the substrate B as shown in FIGS. 1 to 3. In this instance, the position movement module 200 may be integrally coupled onto the coating material coating device 20.

Additionally, the coating thickness measurement module 100 may be disposed in the position movement module 200 and configured to move to the portion of the substrate B rolled on the coating roll R.

As described above, since the position movement module 200 is coupled to the coating material coating device 20 disposed adjacent to the coating roll R, it may be possible to move the coating thickness measurement module 100 to the portion of the substrate B rolled on the coating roll R more easily.

Additionally, since the position movement module 200 may be disposed more adjacent to the coating roll R, it may be possible to further reduce the workload of the position movement module 200. Accordingly, it may be possible to minimize the reduction in thickness measurement accuracy of the coating material S due to vibration occurring by the operation of the position movement module 200.

In an embodiment, the position movement module 200 may include a first position movement unit 210 and a guide unit 220.

The first position movement unit 210 may be configured to move the coating thickness measurement module 100 in the lengthwise direction (±Y) of the coating roll R. The guide unit 220 may be configured to guide the movement of the first position movement unit 210 in the lengthwise direction of the coating roll R. In an example, the guide unit 220 may be a linear motion guide (LM guide), and may be extended in the lengthwise direction of the coating roll R. In this instance, the guide unit 220 may be disposed on the bottom surface of the work area.

By the exemplary configuration, it may be possible to achieve more stable movements of the position movement module 200 in the lengthwise direction of the coating roll R. Accordingly, it may be possible to minimize the reduction in thickness measurement accuracy of the coating material S due to vibration occurring by the operation of the position movement module 200. Additionally, it may be possible to achieve more stable adjustment of the distance between the plurality of coating thickness measurement modules 100 in the lengthwise direction of the coating roll R.

In particular, the guide unit 220 may be coupled to the coating material coating device 20. In this instance, the guide unit 220 may be integrally coupled onto the coating material coating device 20.

By the exemplary configuration, since the guide unit 220 is coupled to the coating material coating device 20 disposed adjacent to the coating roll R, it may be possible to move the coating thickness measurement module 100 to the portion of the substrate B rolled on the coating roll R more easily.

Additionally, since the guide unit 220 may be disposed more adjacent to the coating roll R, it may be possible to further reduce the workload of the position movement module 200 in the horizontal direction and the vertical direction of the coating roll R. Accordingly, it may be possible to minimize the reduction in thickness measurement accuracy of the coating material S due to vibration occurring by the operation of the position movement module 200.

In an embodiment, the position movement module 200 may further include a second position movement unit 230.

The second position movement unit 230 may be coupled to one side (for example, the upper side) of the first position movement unit 210. Additionally, the second position movement unit 230 may be configured to move the coating thickness measurement module 100 in at least one direction of the horizontal direction (±X) or the vertical direction (±Z) of the coating roll R perpendicular to the lengthwise direction (±Y) of the coating roll R. More specifically, the second position movement unit 230 may include a horizontal direction movement unit 232, a vertical direction movement unit 234 and a support bracket 236.

The horizontal direction movement unit 232 may move the coating thickness measurement module 100 in the horizontal direction of the coating roll R. In this instance, the horizontal direction movement unit 232 may be coupled to one side (for example, the upper side) of the first position movement unit 210. In an example, the horizontal direction movement unit 232 may be an actuator that operates by a motor (not shown).

The vertical direction movement unit 234 may move the coating thickness measurement module 100 in the vertical direction of the coating roll R. In this instance, the vertical direction movement unit 234 may be coupled to one side (for example, the upper side) of the horizontal direction movement unit 232. In an example, the vertical direction movement unit 234 may be an actuator that operates by a motor (not shown).

The support bracket 236 may be disposed in the vertical direction movement unit 234, and the support bracket 236 may be disposed in the coating thickness measurement module 100.

Additionally, the coating thickness measurement module 100 may be configured to measure the thickness of the coating material S applied to the substrate B at the location to which the coating thickness measurement module 100 is moved by the second position movement unit 230.

That is, the coating thickness measurement module 100 may move in at least one direction of the horizontal direction or the vertical direction of the coating roll R by the second position movement unit 230. In particular, the coating thickness measurement module 100 may move in at least one direction of the horizontal direction or the vertical direction of the coating roll R and fix the position to measure the thickness of the coating material S applied to the portion of the substrate B rolled on the coating roll R.

Since the coating thickness measurement module 100 is configured to measure the thickness of the coating material S in the fixed state at the thickness measurement location with minimized shakes of the substrate B, it may be possible to measure the thickness of the coating material S more accurately.

Figure 10:
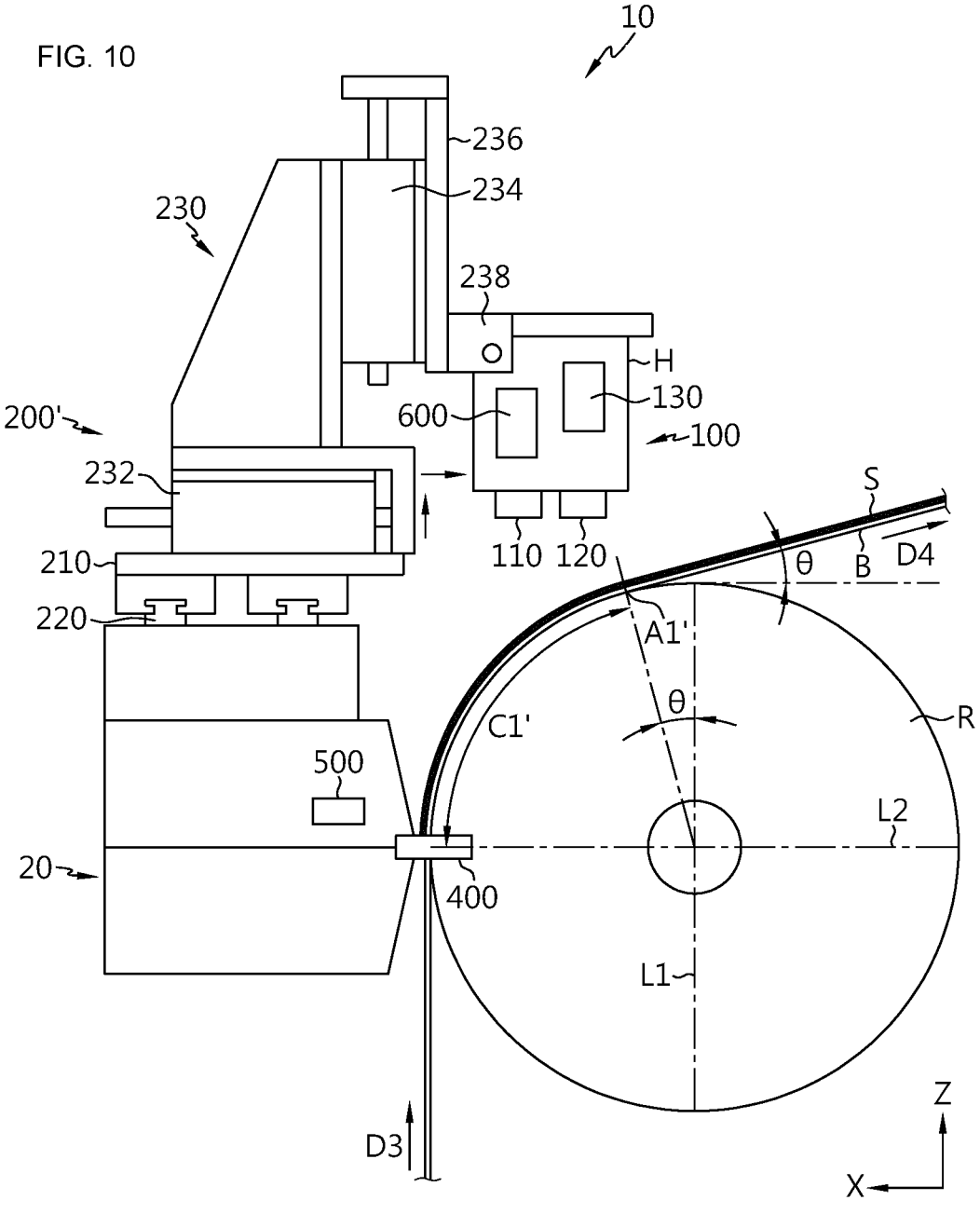
FIGS. 10 and 11 are diagrams showing variations of a location movement module according to an embodiment of the present disclosure.
Figure 11:
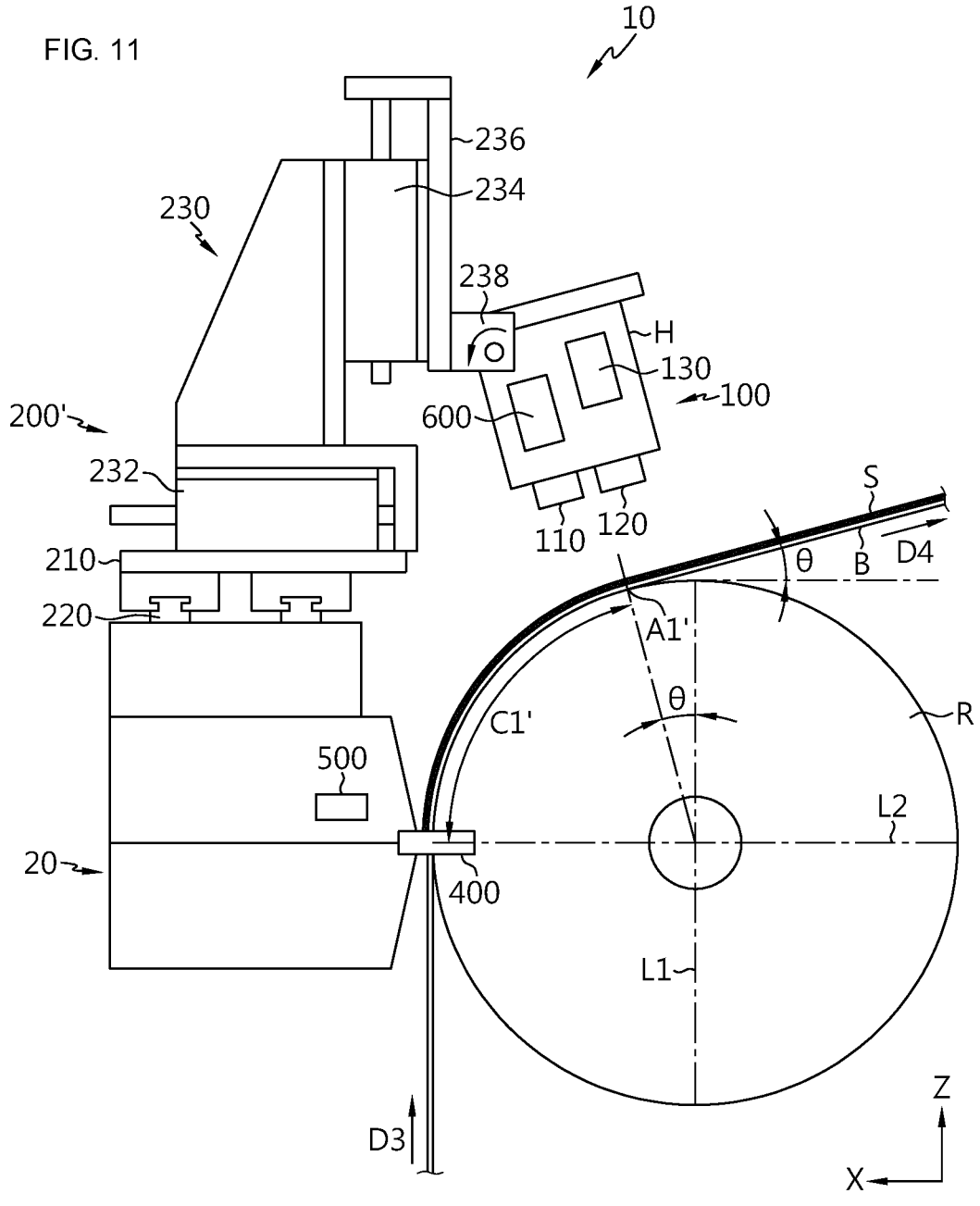
Figure 12:
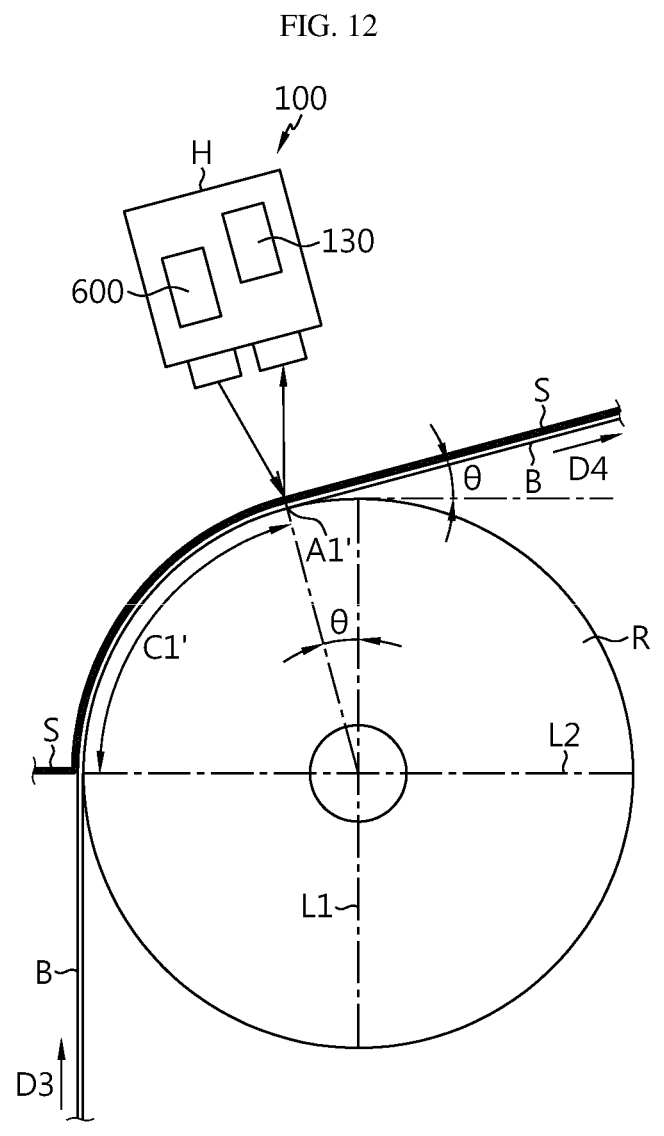

FIGS. 10 and 11 are diagrams showing variations of the position movement module of the present disclosure, and FIG. 12 is a diagram showing the coating thickness measurement module shown in FIG. 11 measuring the thickness of the coating material applied to the substrate.

When compared with the position movement module of the above-described embodiment, the position movement module 200' shown in FIGS. 10 and 11 may further include a rotation actuation unit 238 to rotate the coating thickness measurement module 100 in the clockwise or counterclockwise direction.

That is, the position movement module 200 according to the above-described embodiment is configured to move the coating thickness measurement module 100 in 3-axis directions with respect to the coating roll R, while the position movement module 200' according to this variation further includes the rotation actuation unit 238, and may not only move but also rotate the coating thickness measurement module 100 in 3-axis directions. Accordingly, by the position movement module 200' according to the variation, it may be possible to set the measurement location of the coating thickness measurement module 100 with respect to the substrate B rolled on the cylindrical coating roll R more efficiently and accurately.

The rotation actuation unit 238 may be fixedly coupled to the support bracket 236 as shown in FIG. 10, and may be connected to the housing H of the coating thickness measurement module 100. Additionally, the rotation actuation unit 238 may include, for example, a gear box, a rotation shaft, a gear, a servo motor (not shown) or the like, and may be configured to rotate the housing H in the forward and backward direction by forward and backward rotation of the servo motor. However, the scope of protection of the present disclosure is not limited thereto. The rotation actuation unit 238 may include any configuration having a mechanical mechanism for rotating the coating thickness measurement module in the forward and backward direction.

By the position movement module 200' including the rotation actuation unit 238, since the angle of the coating thickness measurement module 100 may be adjusted when measuring the thickness of the coating material S applied to the portion in direct contact with the outer surface of the coating roll R, it may be possible to minimize the incident angle of light applied to the surface of the coating material S and the reflection angle of light reflected from the surface of the coating material S, thereby measuring the thickness of the coating material S more accurately.

In addition, in FIG. 6, the substrate feed direction D1 before coating and the substrate transport direction D2 after coating may change as indicated by 'D3' and 'D4' in FIG. 10 according to the relative positional relationship between the coating roll R and the guide roll (not shown).

In this case, the area of the substrate B coated with the coating material S of which the thickness is to be measured by the coating thickness measurement module 100 may be indicated by C1' in FIG. 10. In this instance, the end portion A1' at which the contact between the substrate B and the coating roll R is maintained is a location after rotation in the counterclockwise direction at a predetermined angle θ on the basis of the vertical center line L1 of the coating roll R.

However, in the above-described case, the coating thickness measurement module 100 according to the above-described embodiment always faces downwards, and thus it is difficult to accurately apply light from the direction facing the thickness measurement point A1'. However, according to this variation, the coating thickness measurement module 100 in the condition as shown in FIG. 10 may rotate in the counterclockwise direction by the predetermined angle θ as shown in FIG. 11 by the operation of the rotation actuation unit 238. Additionally, as shown in FIG. 12, light may be applied to the thickness measurement point A1' of the coating material S through the light applying unit 110, and light reflected from the thickness measurement point A1' of the coating material S may be acquired through the light acquisition unit 120. According to this variation, it may be possible to measure the thickness of the coating material S applied to the portion of the substrate B rolled on the coating roll R more accurately.

Meanwhile, the coating roll R may include a heater (not shown) to heat the outer surface of the coating roll R to uniformly apply the coating material S to the substrate B. When the temperature of the outer surface of the coating roll R changes by the heater, an error may occur in the thickness measurement value of the coating material S.

Referring back to FIG. 4, the coating thickness measuring device 10 may further include a temperature measurement module 300.

The temperature measurement module 300 may be configured to measure temperature changes of the coating roll R at the location of the coating roll R on which the substrate B is rolled. In an example, the temperature measurement module 300 may be an ultraviolet temperature sensor, and may be disposed in the support bracket 236.

Specifically, the temperature measurement module 300 may be disposed in the support bracket 236 to measure the temperature change value of the coating roll R of an area corresponding to the same location as the location of the coating material S of which the thickness is to be measured by the coating thickness measurement module 100.

Additionally, the temperature measurement module 300 may measure the temperature change value of the coating roll R simultaneously with the thickness measurement of the coating material S applied to the substrate B by the coating thickness measurement module 100.

The processor 130 may correct the thickness value of the coating material S measured by the coating thickness measurement module 100 using the temperature change value of the coating roll R measured by the temperature measurement module 300.

By the exemplary configuration of the present disclosure, it may be possible to measure temperature changes of the coating roll R of the area corresponding to the same location as the location of the coating material S of which the thickness is measured by the coating thickness measurement module 100 simultaneously with the thickness measurement of the coating material S by the coating thickness measurement module 100, thereby measuring the thickness of the coating material S in real time and correcting it.

In particular, since the temperature measurement module 300 may be disposed in the support bracket 236 in which the coating thickness measurement module 100 is disposed, the coating thickness measurement module 100 and the temperature measurement module 300 may be disposed adjacent to each other, thereby measuring the thickness of the coating material S in real time and easily correct it.

Additionally, since the temperature measurement module 300 is disposed in the support bracket 236, it may be possible to measure temperature changes of the coating roll R more stably under the minimized influence of vibration.

Referring back to FIGS. 1 to 6, the coating thickness measuring device 10 may further include a coating roll rotation detection module 400 and a vibration measurement module 500.

The coating roll rotation detection module 400 and the vibration measurement module 500 may be disposed in the coating material coating device 20.

The coating roll rotation detection module 400 may be coupled to the end of the coating material coating device 20 adjacent to the coating roll R and configured to detect one revolution of the coating roll R. In an example, the coating roll rotation detection module 400 may be a rotary encoder. By way of example, the coating roll rotation detection module 400 may detect one revolution of the coating roll R based on the rotation direction and rotation speed of the coating roll R.

The vibration measurement module 500 may be configured to measure the roundness of the coating roll R. In an example, the vibration measurement module 500 may be a vibration sensor. By way of example, the vibration measurement module 500 may measure the unique vibrational frequency of the coating roll R.

By way of example, the processor 130 may generate a virtual memory zone including a plurality of memory areas by dividing one revolution of the coating roll R detected by the coating roll rotation detection module 400. In this instance, the processor 130 may store the measured roundness value of the coating roll R in the virtual memory zone. That is, the processor 130 may store the roundness value of the coating roll R corresponding to the corresponding location for each of the plurality of memory areas corresponding to divisions of one revolution of the coating roll R.

Additionally, the processor 130 may correct the thickness value of the coating material S measured by the coating thickness measurement module 100 using the roundness value of the coating roll R stored in the virtual memory zone.

By the exemplary configuration of the present disclosure, since the coating roll rotation detection module 400 is coupled to the end of the coating material coating device 20, it may be possible to accurately detect one revolution of the coating roll R, and since the vibration measurement module 500 is disposed in the coating material coating device 20, it may be possible to accurately measure the roundness of the coating roll R. Accordingly, it may be possible to correct the thickness of the coating material S more accurately.

Referring back to FIGS. 1 to 6, the coating thickness measuring device 10 may further include a coating detection module 600.

The coating detection module 600 may be configured to detect whether the coating material S has been applied to the substrate B. In an example, the coating detection module 600 may be a photoelectric sensor, and may be disposed in the support bracket 236.

That is, since the coating detection module 600 is disposed in the support bracket 236, the coating detection module 600 may measure whether the coating material S has been applied to the substrate B more stably under the minimized influence of vibration.

The position movement module 200 may be configured to control the position of the coating thickness measurement module 100 in response to the detection of the coating material S applied to the substrate B by the coating detection module 600. That is, by the exemplary configuration of the present disclosure, it may be possible to measure the thickness of the coating material S in real time by the coating thickness measurement module 100 simultaneously with the detection of the coating material S applied to the substrate B by the coating detection module 600.

The processor 130 may be configured to correct the thickness of the coating material S applied to the substrate B using the measurement data acquired from the coating thickness measuring device 10. In this instance, the measurement data acquired from the coating thickness measuring device 10 may include the thickness data of the coating material S measured by the coating thickness measurement module 100, the temperature change value of the coating roll R measured by the temperature measurement module 300, and the roundness value of the coating roll R measured by the vibration measurement module 500.

That is, the processor 130 may be configured to finally determine the thickness of the coating material S applied to the substrate B through the correction using the measurement data acquired from the coating thickness measuring device 10.

As described above, according to an embodiment of the present disclosure, it is possible to improve the thickness measurement accuracy of the coating material S applied to the substrate B by minimizing the influence of shake of the substrate B on the thickness measurement of the coating material S.

Additionally, since the temperature changes and roundness of the coating roll R are measured, and the measured thickness of the coating material S is determined by correcting the measured thickness value of the coating material S using the same, it may be possible to measure the thickness the coating material S more accurately.

Figure 13:
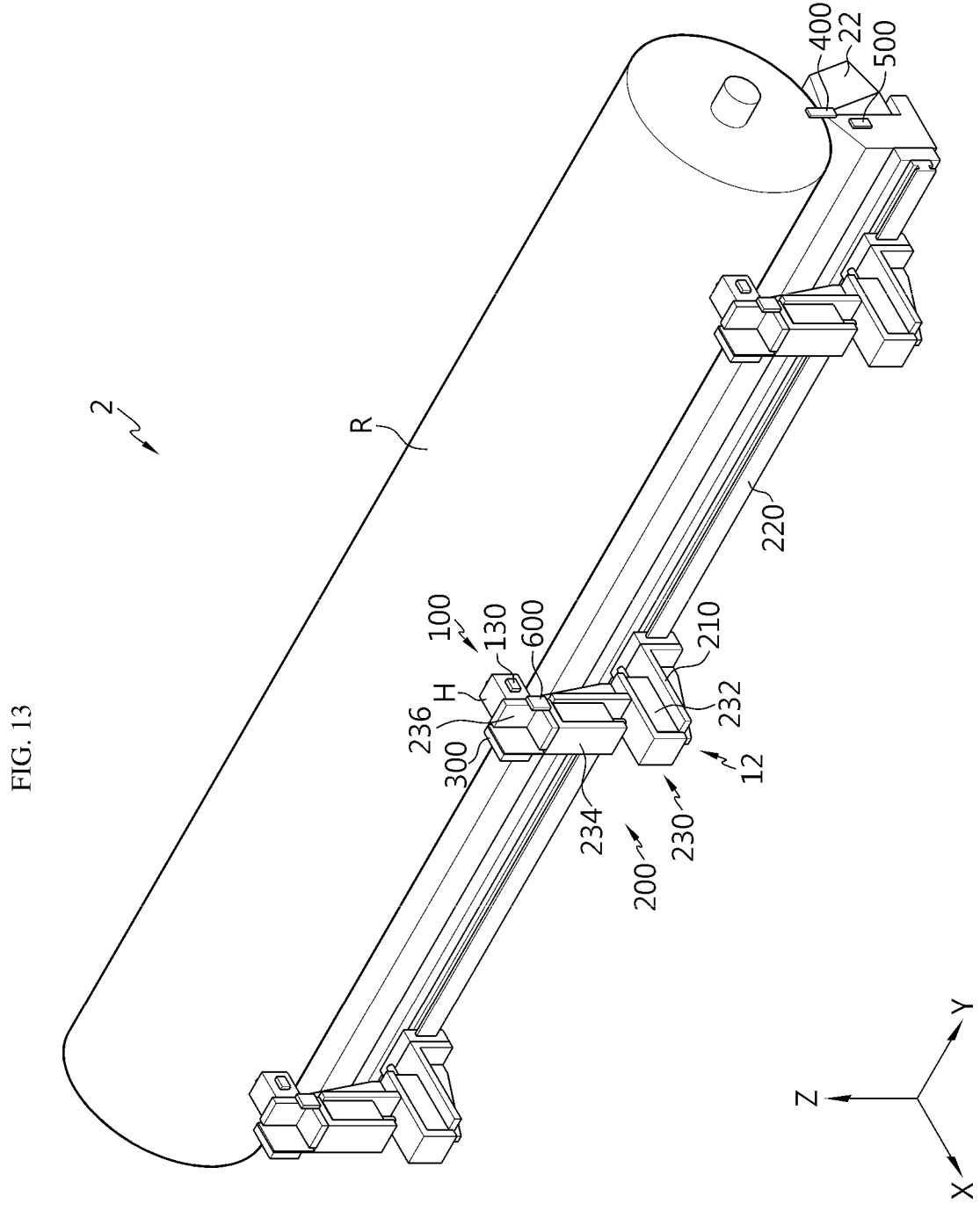
FIG. 13 is a diagram showing the entire shape of a coating device according to another embodiment of the present disclosure.
Figure 14:
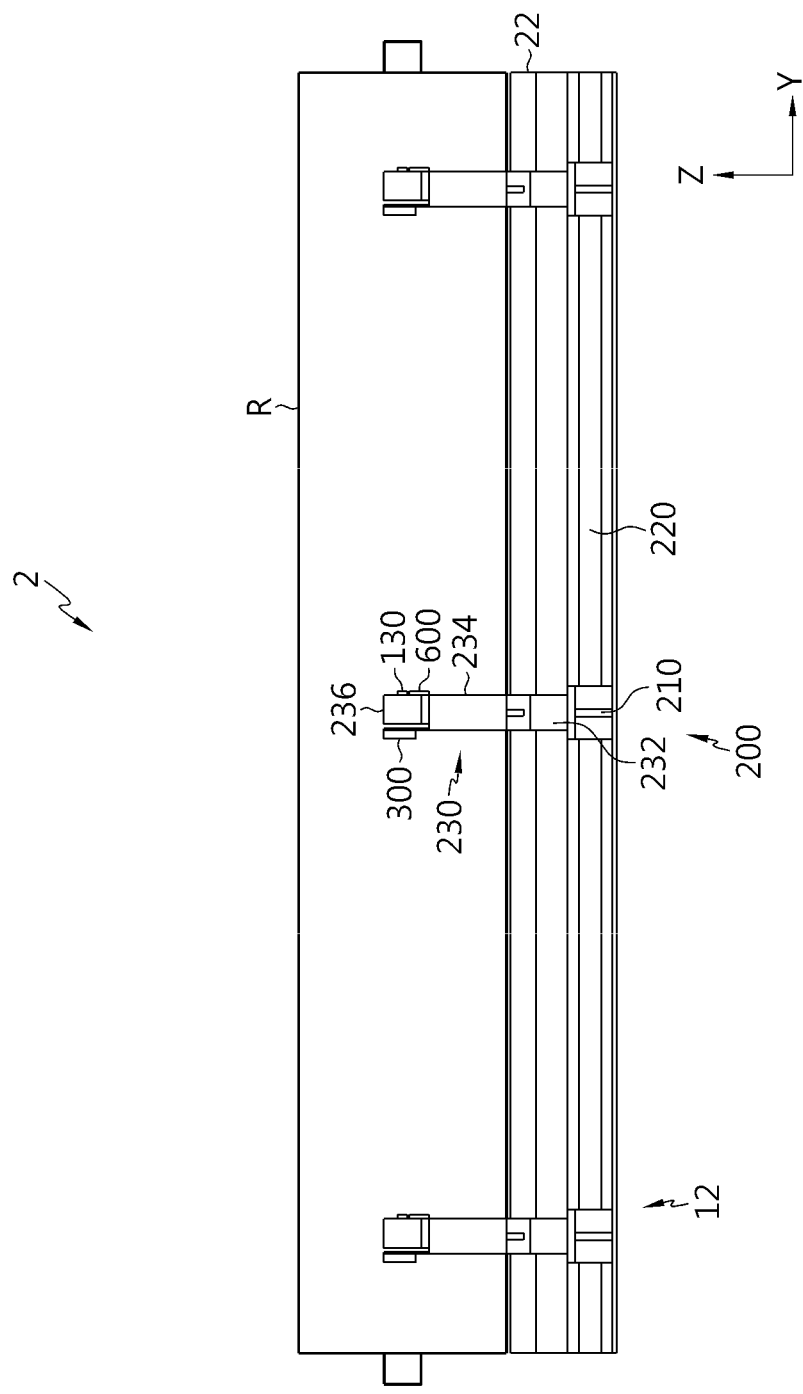
FIG. 14 is a front view of a coating thickness measuring device of the coating device of FIG. 13.
Figure 15:
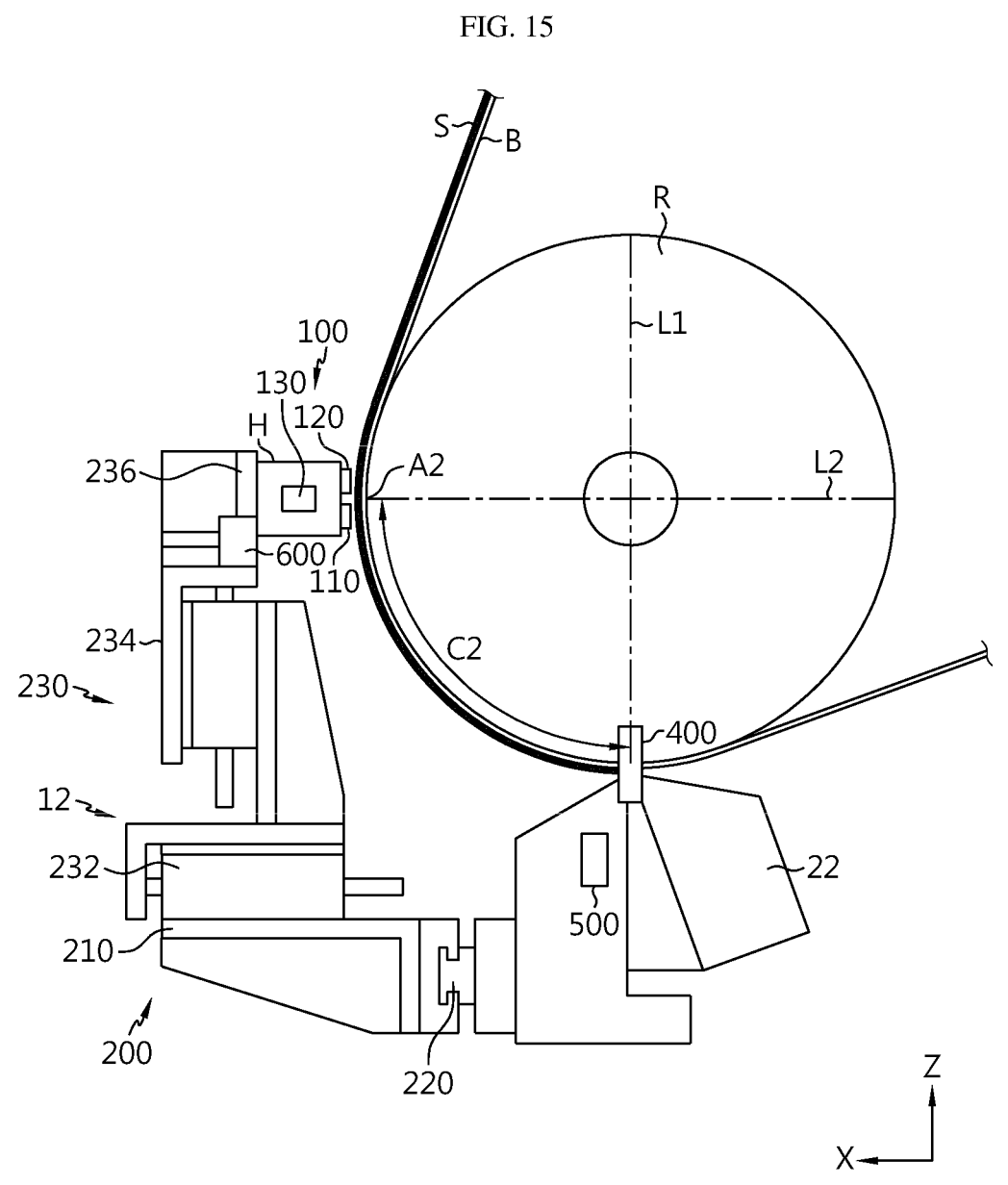
Figure 16:
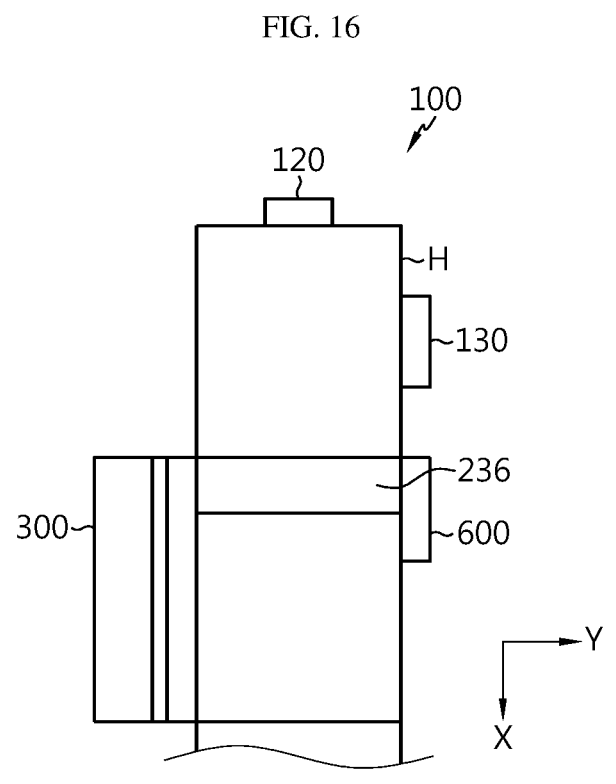

FIG. 13 is a diagram showing the entire shape of a coating device 2 according to another embodiment of the present disclosure, FIG. 14 is a front view of a coating thickness measuring device 12 of the coating device 2 of FIG. 13, FIG. 15 is a side view of the coating thickness measuring device 12 shown in FIG. 13, and FIG. 16 is a partial top view of the coating thickness measuring device 12 shown in FIG. 13.

The coating device 2 according to another embodiment of the present disclosure is shown. The coating device 2 according to this embodiment is similar to the coating device 1 of the previous embodiment, and in the description of the components that are substantially identical or similar to the previous embodiment, redundant description is omitted and difference(s) between this embodiment and the previous embodiment will be described below.

Referring to FIGS. 13 to 16, the coating device 2 according to another embodiment of the present disclosure may include the coating thickness measuring device 12 and a coating material coating device 22.

The coating thickness measuring device 12 may include the coating thickness measurement module 100 and the position movement module 200.

The coating thickness measurement module 100 may be configured to measure the thickness of the coating material S applied to the substrate B which is fed by the coating roll R on which the substrate B is rolled. The coating thickness measurement module 100 may include the light applying unit 110, the light acquisition unit 120 and the processor 130.

The light applying unit 110 may be configured to apply light to the surface of the coating material S applied to a portion of the substrate B rolled on the coating roll R. In the coating thickness measuring device 12 according to this embodiment, the portion of the substrate B rolled on the coating roll R may refer to a portion of the substrate B located between the upper end and the lower end of the coating roll R on the basis of the horizontal center line L2 of the coating roll R.

The coating material coating device 22 may apply the coating material S to the substrate B. In the coating thickness measuring device 12 according to this embodiment, the coating material coating device 22 may be disposed on the vertical center line L1 of the coating roll R. That is, the coating material coating device 22 may be disposed under the coating roll R.

Additionally, the position movement module 200 may be integrally coupled to the coating material coating device 22 in the horizontal direction of the coating roll R. Additionally, the guide unit 220 of the position movement module 200 may be integrally coupled to the coating material coating device 22 in the horizontal direction of the coating roll R.

Figure 17:
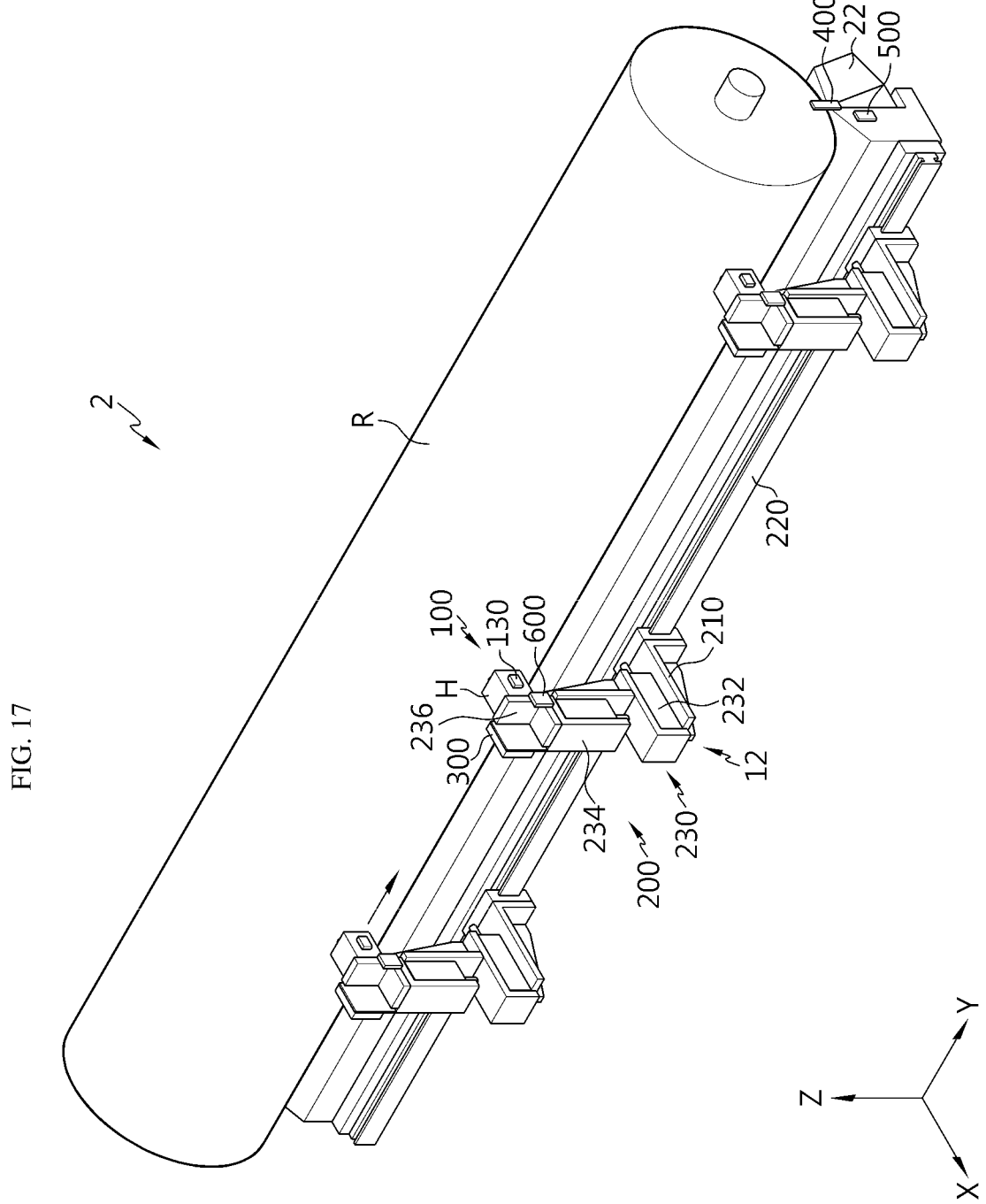
Figure 18:
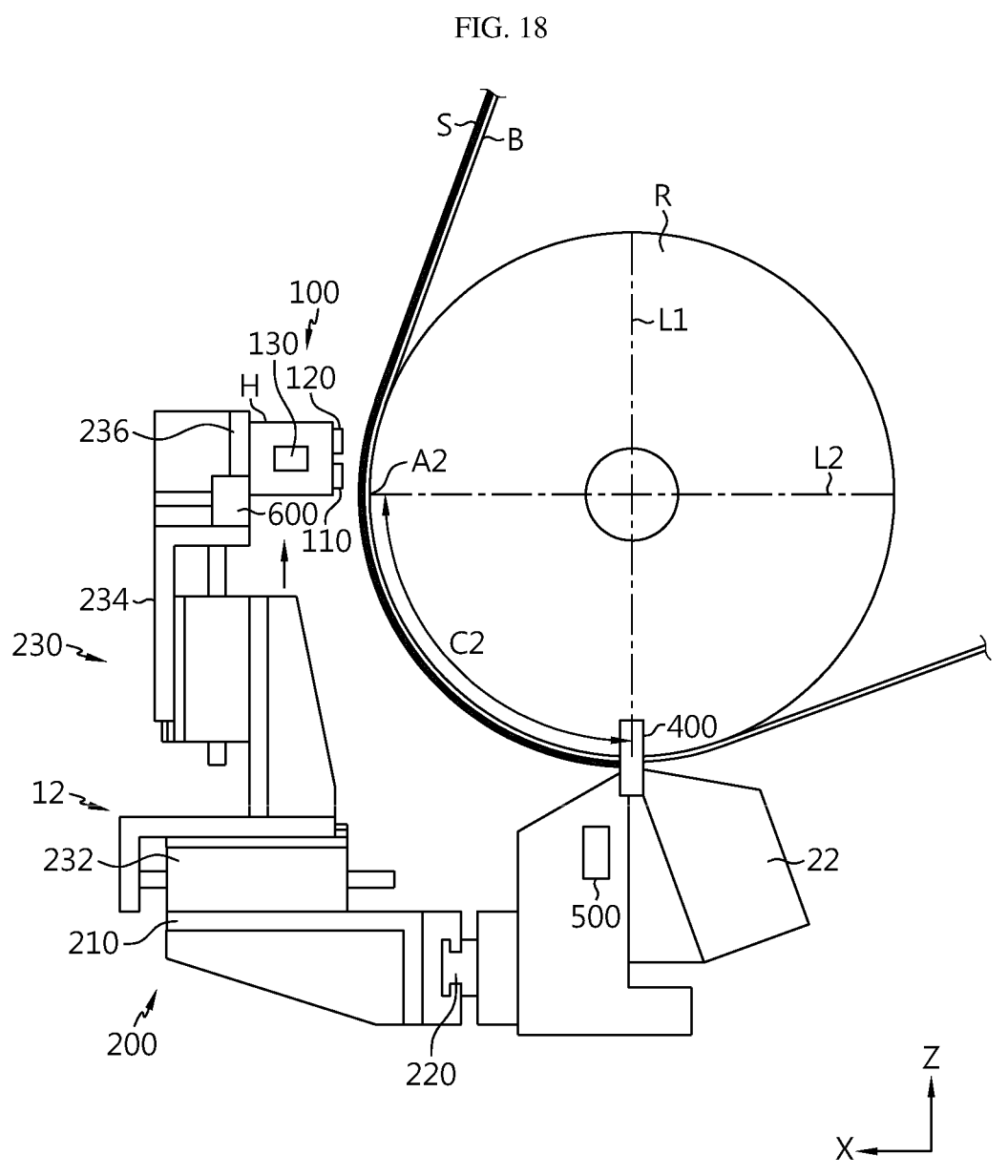

FIGS. 17 and 18 are diagrams showing the coating thickness measuring device 12 shown in FIG. 13 moving with respect to the coating roll R. Specifically, FIG. 17 is a diagram showing the coating thickness measurement module 100 moving in the lengthwise direction of the coating roll R, and FIG. 18 is a diagram showing the coating thickness measurement module 100 moving in the horizontal direction and the vertical direction of the coating roll R.

Referring to FIGS. 13 to 18, in the same way as the previous embodiment, the coating thickness measurement module 100 of the coating thickness measuring device 12 according to this embodiment may move in at least one direction of the horizontal direction or the vertical direction of the coating roll R to apply light to the portion of the substrate B rolled on the coating roll R. Accordingly, it may be possible to measure the thickness of the coating material S more accurately at the thickness measurement location with minimized shake of the substrate B. Additionally, the coating thickness measurement module 100 may be configured to move in the lengthwise direction of the coating roll R which is the widthwise direction of the substrate B.

Figure 19:
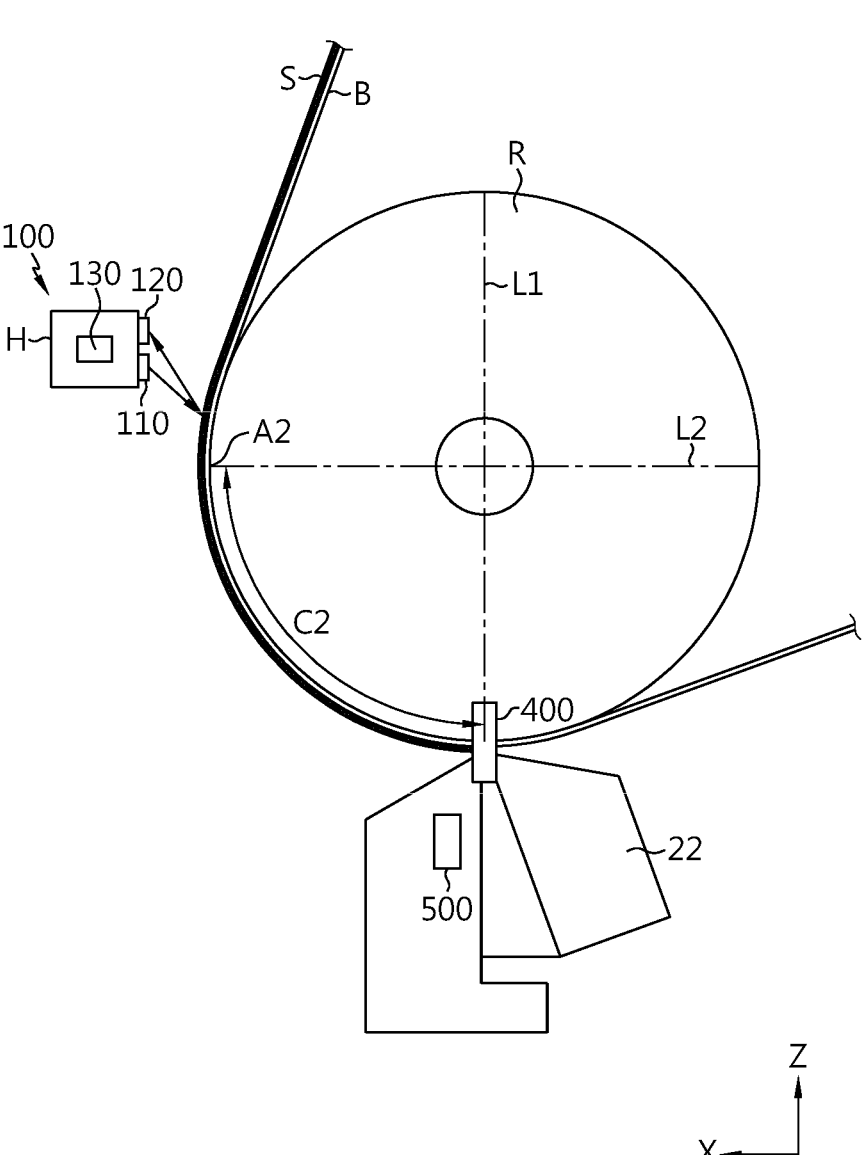
FIGS. 19 to 21 are diagrams showing a coating thickness measurement module shown in FIG. 13 measuring the thickness of a coating material applied to a substrate.
Figure 20:
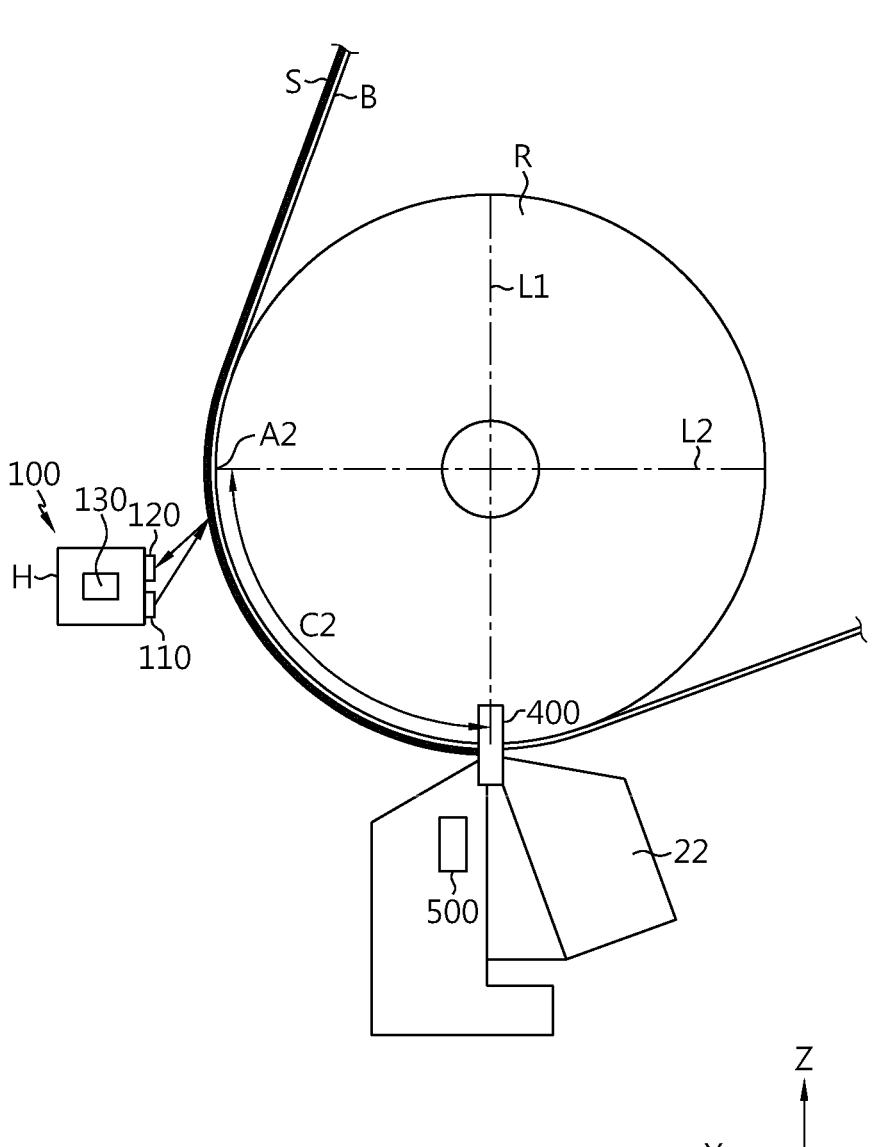
Figure 21:
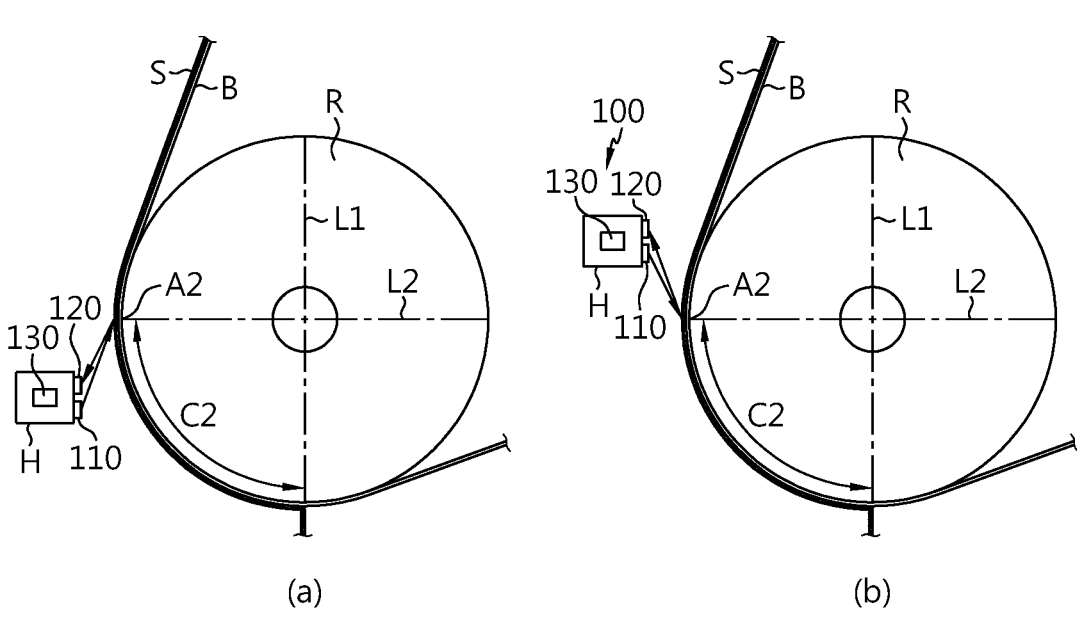
Figure 21:
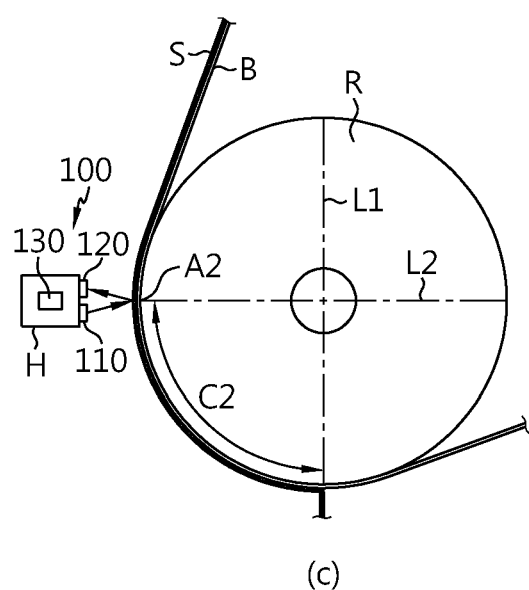

FIGS. 19 to 21 are diagrams showing the coating thickness measuring device 12 shown in FIG. 13 measuring the thickness of the coating material S applied to the substrate B. Specifically, FIG. 19 is a diagram showing the coating thickness measurement module 100 located at the upper side on the basis of the horizontal center line L2 of the coating roll R, FIG. 20 is a diagram showing the coating thickness measurement module 100 located at the lower side on the basis of the horizontal center line L2 of the coating roll R, and FIG. 21 is a diagram showing the coating thickness measurement module 100 measuring the thickness of the coating material S applied to the portion of the substrate B located on the center line of the coating roll R.

Referring to FIG. 19, in the coating thickness measuring device 12 according to this embodiment, the coating thickness measurement module 100 may measure the thickness of the coating material S applied to the substrate B when it is located at the upper side on the basis of the horizontal center line L2 of the coating roll R.

Alternatively, the coating thickness measurement module 100 may measure the thickness of the coating material S applied to the substrate B when it is located at the lower side on the basis of the horizontal center line L2 of the coating roll R as shown in FIG. 20.

In this instance, the substrate B located at the lower side on the basis of the horizontal center line L2 of the coating roll R may be rolled in close contact with the outer surface of the coating roll R. More specifically, the substrate B located at the lower side on the basis of the horizontal center line L2 of the coating roll R may come into close contact with the outer surface of the coating roll R between the vertical center line L1 of the coating roll R and the left end of the coating roll R.

That is, as shown in FIG. 20, the coating thickness measurement module 100 may be configured to measure the thickness of the coating material S applied to the portion of the substrate B contacting the outer surface of the coating roll R. In this instance, the coating thickness measurement module 100 may be configured to measure the thickness of the coating material S applied to the substrate B in close contact with the outer surface of the coating roll R from a point at which the coating material coating device 22 starts applying the coating material S to the left end of the coating roll R. Specifically, in FIG. 20, an area of the substrate B coated with the coating material S of which the thickness is to be measured by the coating thickness measurement module 100 may be indicated by 'C2'. That is, the area of the substrate B indicated by 'C2' in FIG. 20 may be the portion of the substrate B in close contact with the outer surface of the coating roll R from the point at which the coating material coating device 22 starts applying the coating material S to the left end of the coating roll R.

Additionally, the coating thickness measurement module 100 may move in at least one direction of the horizontal direction or the vertical direction of the coating roll R and fix the location to measure the thickness of the coating material S applied to the portion of the substrate B in direct contact with the outer surface of the coating roll R among the entire area of the substrate B.

Accordingly, the coating thickness measurement module 100 may measure the thickness of the coating material S more accurately at the thickness measurement location with further minimized shake of the substrate B.

In the coating thickness measuring device 12 according to this embodiment, the coating thickness measurement module 100 may be configured to measure the thickness of the coating material S applied to the portion of the substrate B located on the center line of the coating roll R as shown in FIG. 21.

More specifically, as shown in (a) of FIG. 21, when it is located at the lower side on the basis of the horizontal center line L2 of the coating roll R, the coating thickness measurement module 100 may measure the thickness of the coating material S applied to the portion A2 (the left end of the coating roll R) of the substrate B located on the horizontal center line L2 of the coating roll R.

In this instance, when it is located at the lower side on the basis of the horizontal center line L2 of the coating roll R, the light applying unit 110 may apply light to the surface of the coating material S applied to the portion A2 of the substrate B located on the horizontal center line L2 of the coating roll R, and the light acquisition unit 120 may acquire light reflected from the surface of the coating material S applied to the portion A2 of the substrate B located on the horizontal center line L2 of the coating roll R.

Alternatively, as shown in (b) of FIG. 21, when it is located at the upper side on the basis of the horizontal center line L2 of the coating roll R, the coating thickness measurement module 100 may measure the thickness of the coating material S applied to the portion A2 of the substrate B located on the horizontal center line L2 of the coating roll R.

In this instance, when it is located at the upper side on the basis of the horizontal center line L2 of the coating roll R, the light applying unit 110 may apply light to the surface of the coating material S applied to the portion A2 of the substrate B located on the horizontal center line L2 of the coating roll R. Additionally, the light acquisition unit 120 may acquire light reflected from the surface of the coating material S applied to the portion A2 of the substrate B located on the horizontal center line L2 of the coating roll R.

Since the coating thickness measurement module 100 may measure the thickness of the coating material S applied to the portion of the substrate B located on the center line of the coating roll R at which the degree of bend of the substrate B rolled on the coating roll R is minimum, it may be possible to measure the thickness of the coating material S more accurately.

Additionally, referring to (c) of FIG. 21, when it is located on the center line of the coating roll R (for example, the horizontal center line L2), the coating thickness measurement module 100 may be configured to measure the thickness of the coating material S applied to the portion of the substrate B located on the center line of the coating roll R (for example, the portion A2 of the substrate B located on the horizontal center line L2 of the coating roll R).

In this case, the coating thickness measurement module 100 may not only measure the thickness of the coating material S applied to the portion of the substrate B located on the center line of the coating roll R at which the degree of bend of the substrate B rolled on the coating roll R is minimum, but also minimize the incident angle of light applied to the surface of the coating material S and the reflection angle of light reflected from the surface of the coating material S, thereby measuring the thickness of the coating material S more accurately.

By the coating device 2 according to this embodiment, when the coating material coating device 22 is located under the coating roll R, it may be also possible to improve the thickness measurement accuracy of the coating material S applied to the substrate B, thereby making various types of coating devices depending on the work environment. That is, when the work environment is narrow, the coating material coating device 22 may be disposed under the coating roll R, thereby achieving more compact design of the coating device.

While the present disclosure has been hereinabove described with regard to a limited number of embodiments and drawings, the present disclosure is not limited thereto and it is apparent that a variety of changes and modifications may be made by those skilled in the art within the technical aspect of the present disclosure and the scope of the appended claims and their equivalents.

The terms indicating directions such as upper, lower, left, right, front and rear are used for convenience of description, but it is obvious to those skilled in the art that the terms may change depending on the position of the stated element or an observer.

What is claimed is:

1. A coating device comprising a coating thickness measuring device configured to measure a thickness of a coating material applied to a substrate which is fed by a coating roll on which the substrate is rolled, and a coating material coating device which applies the coating material to the substrate, wherein the coating thickness measuring device comprises:

a coating thickness measurement module and, a position movement module configured to move the coating thickness measurement module with respect to the coating roll, wherein the coating thickness measurement module includes:

a light applying unit configured to apply light to a surface of the coating material applied to a portion of the substrate rolled on the coating roll;

a light acquisition unit configured to acquire light reflected from the surface of the coating material; and a processor configured to calculate the thickness of the coating material based on the acquired light, wherein the coating material coating device is a slot die that dispenses the coating material through an outlet formed in the shape of a slit, wherein the position movement module is coupled to an outer side of the slot die so as to be integrated with the slot die, wherein the coating thickness measurement module is disposed in the position movement module and configured to move to the portion of the substrate rolled on the coating roll.

2. The coating device according to claim 1, wherein the coating thickness measurement module is configured to move in 3-axis directions with respect to the coating roll to apply the light to the portion of the substrate rolled on the coating roll.

3. The coating device according to claim 1, wherein the coating thickness measurement module is configured to measure the thickness of the coating material applied to a portion of the substrate contacting an outer surface of the coating roll.

4. The coating device according to claim 3, wherein the coating thickness measurement module is configured to measure the thickness of the coating material applied to an end portion at which the contact between the substrate and the coating roll is maintained in the portion of the substrate rolled on the coating roll.

5. The coating device according to claim 4, wherein the coating thickness measurement module is configured to measure the thickness of the coating material while it is located on a center line of the coating roll passing through the end portion at which the contact between the substrate and the coating roll is maintained.

6. The coating device according to claim 1, wherein a plurality of the coating thickness measurement modules isare arranged in a lengthwise direction of the coating roll, and wherein a distance between the plurality of coating thickness measurement modules is adjustable.

7. The coating device according to claim 1, wherein the position movement module includes:

a first position movement unit configured to move the coating thickness measurement module in a lengthwise direction of the coating roll; and a guide unit configured to guide the movement of the first position movement unit in the lengthwise direction of the coating roll.

8. The coating device according to claim 7, wherein the guide unit is coupled to a coating material coating device which is configured to apply the coating material to the substrate.

9. The coating device according to claim 7, wherein the position movement module further includes:

a second position movement unit coupled to one side of the first position movement unit and configured to move the coating thickness measurement module in at least one direction of a horizontal direction or a vertical direction of the coating roll perpendicular to the lengthwise direction of the coating roll, and wherein the coating thickness measurement module measures the thickness of the coating material applied to the substrate at a location to which the coating thickness measurement module is moved by the second position movement unit.

10. The coating device according to claim 9, wherein the position movement module further includes:

a rotation actuation unit to rotate the coating thickness measurement module in a clockwise or a counterclockwise direction.

11. The coating device according to claim 1, further comprising:

a temperature measurement module configured to measure a temperature change of the coating roll at a location of the coating roll on which the substrate is rolled.

12. The coating device according to claim 1, further comprising:

a coating roll rotation detection module coupled to an end of the coating material coating device adjacent to the coating roll and configured to detect one revolution of the coating roll; and a vibration measurement module configured to measure roundness of the coating roll.

13. The coating device according to claim 1, wherein the processor is configured to correct the thickness of the coating material applied to the substrate using measurement data acquired from the coating thickness measuring device.

* * * * *